United States Patent [19]
Komiya

[11] Patent Number: 5,115,262
[45] Date of Patent: May 19, 1992

[54] AUTO-FOCUSING APPARATUS

[75] Inventor: Yasuhiro Komiya, Hachioji, Japan

[73] Assignee: Olympus Optical Co., Ltd., Tokyo, Japan

[21] Appl. No.: 687,452

[22] Filed: Apr. 18, 1991

[30] Foreign Application Priority Data

Apr. 25, 1990 [JP] Japan .................. 2-109876
Nov. 8, 1990 [JP] Japan .................. 2-303285

[51] Int. Cl.$^5$ ............ G02B 7/28; H04N 5/232; G03B 13/36
[52] U.S. Cl. .................. 354/402; 358/227
[58] Field of Search ............. 354/402-406; 358/227

[56] References Cited

U.S. PATENT DOCUMENTS

| | | | |
|---|---|---|---|
| 4,644,148 | 2/1987 | Kusaka et al. | 354/406 |
| 4,762,986 | 8/1988 | Suda et al. | 354/402 |
| 4,872,058 | 10/1989 | Baba et al. | 358/227 |
| 4,967,279 | 10/1990 | Murashima | 354/402 X |
| 4,990,947 | 2/1991 | Komiya et al. | 354/402 |
| 5,016,110 | 5/1991 | Vuichard et al. | 358/227 |

FOREIGN PATENT DOCUMENTS

| | | |
|---|---|---|
| 0361355 | 4/1990 | European Pat. Off. |
| 3318983 | 12/1983 | Fed. Rep. of Germany |
| 3417385 | 11/1984 | Fed. Rep. of Germany |
| 3604141 | 8/1987 | Fed. Rep. of Germany |
| 3735091 | 4/1988 | Fed. Rep. of Germany |
| 3733051 | 5/1988 | Fed. Rep. of Germany |
| 3934767 | 4/1990 | Fed. Rep. of Germany |
| 4000343 | 7/1990 | Fed. Rep. of Germany |
| 4006592 | 9/1990 | Fed. Rep. of Germany |
| 2216743 | 10/1989 | United Kingdom |

OTHER PUBLICATIONS

"Automatic Focus Adjustment of Hill-Climbing Servo Scheme in TV Camera", NHK Technical Research, vol. 17, No. 1, Ser. No. 86, 1965, pp. 21-37.

Primary Examiner—Russell E. Adams
Assistant Examiner—Jae Noh
Attorney, Agent, or Firm—Frishauf, Holtz, Goodman & Woodward

[57] ABSTRACT

An auto-focusing apparatus includes a CCD for imaging an optical image formed by a photographing optical system, a motor for changing the position of the CCD along the direction of the optical axis, a BPF for extracting a predetermined frequency component from an image signal read from the CCD, a detector for outputting a focus signal corresponding to a focusing degree by performing square detection of an output signal from the BPF, and a microprocessor for calculating an intermediate parameter $d_{FZP}$ on the basis of the frequency band of the BPF and the F-number of the photographing optical system, determining a sampling interval $\Delta x$ on the basis of a characteristic value COPT of the detector and the intermediate parameter $d_{FZP}$, controlling the motor and the CCD in accordance with the sampling interval, sampling a plurality of focus signals, and detecting an in-focus point by interpolating the focus signals.

16 Claims, 21 Drawing Sheets

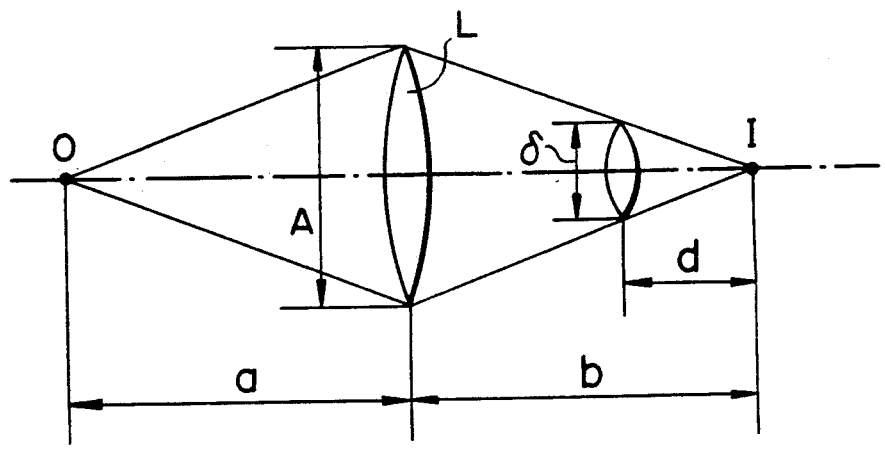
F I G. 4
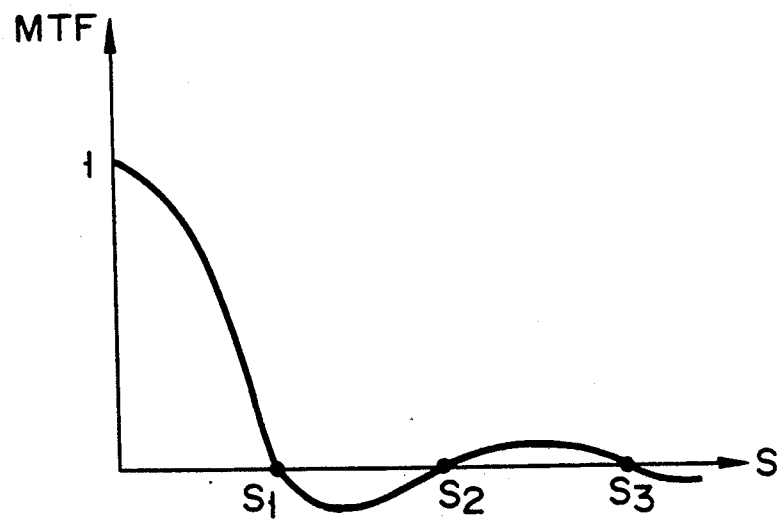
F I G. 5
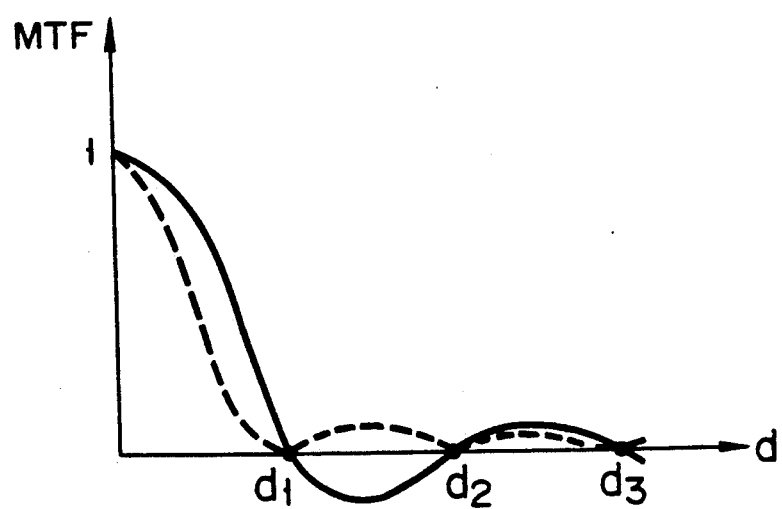
F I G. 6

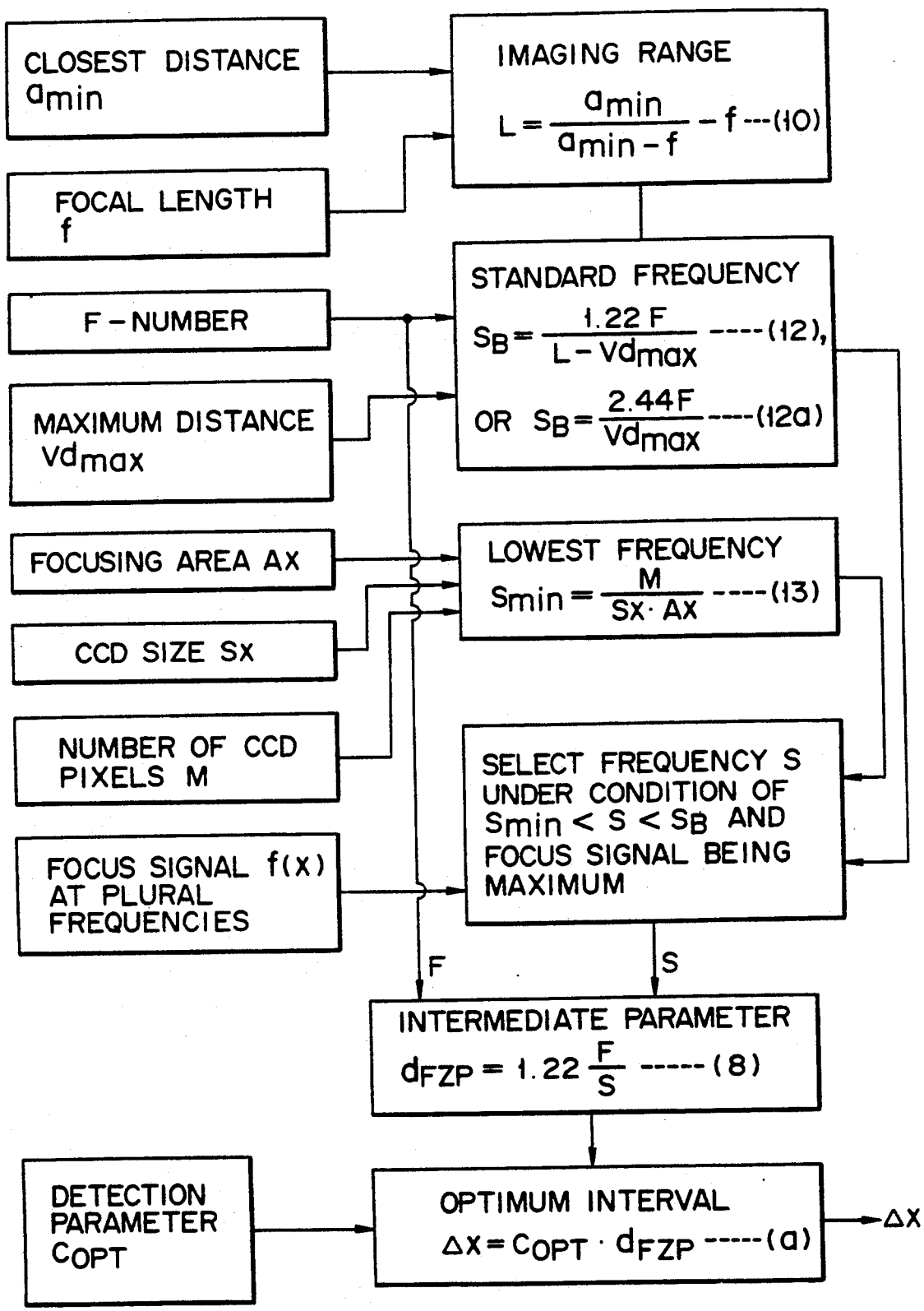
F I G. 12

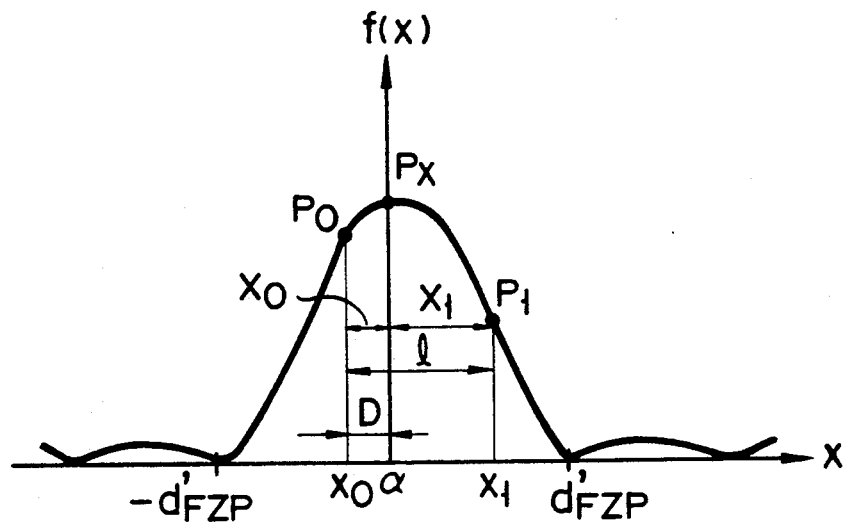
F I G. 13
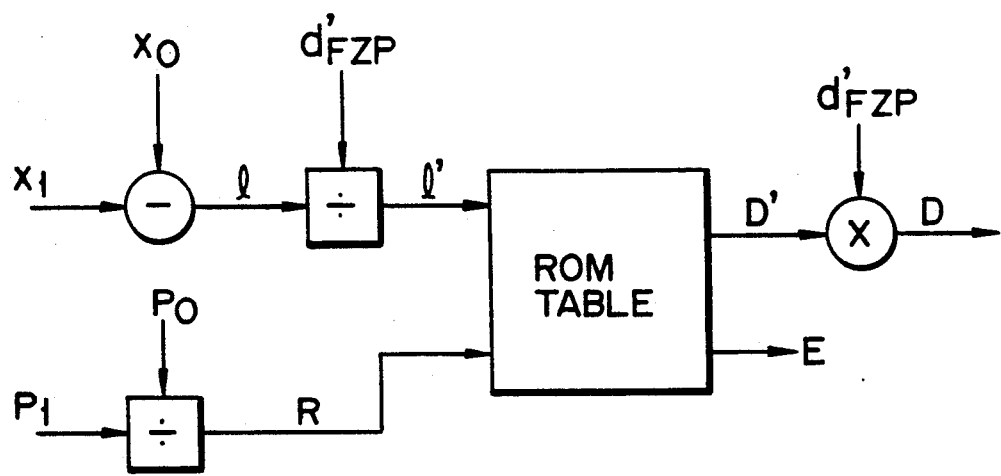
F I G. 14

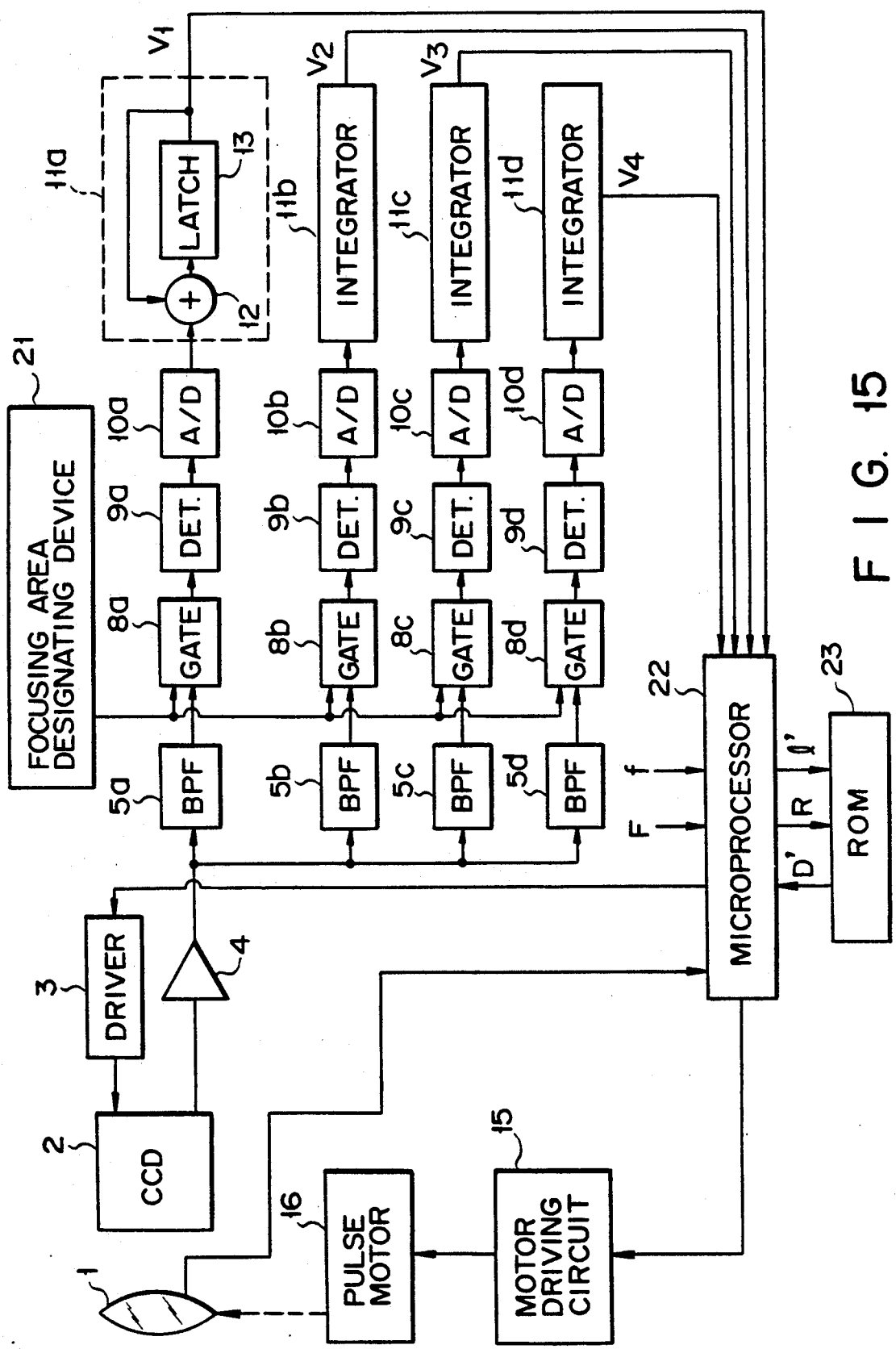
F I G. 15

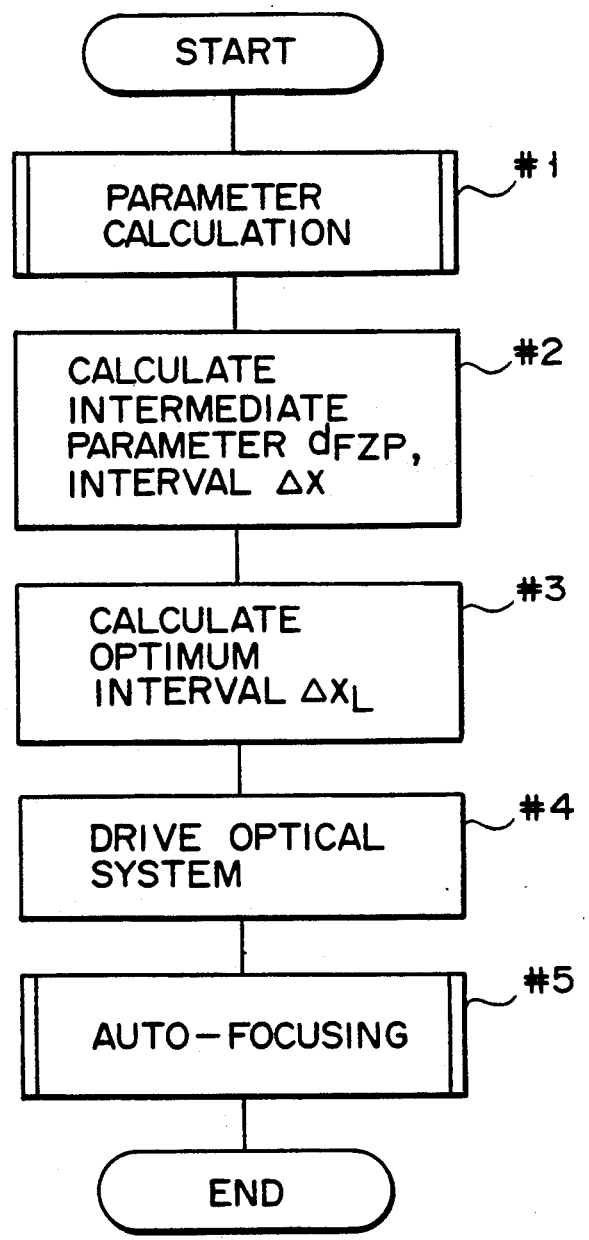
F I G. 16

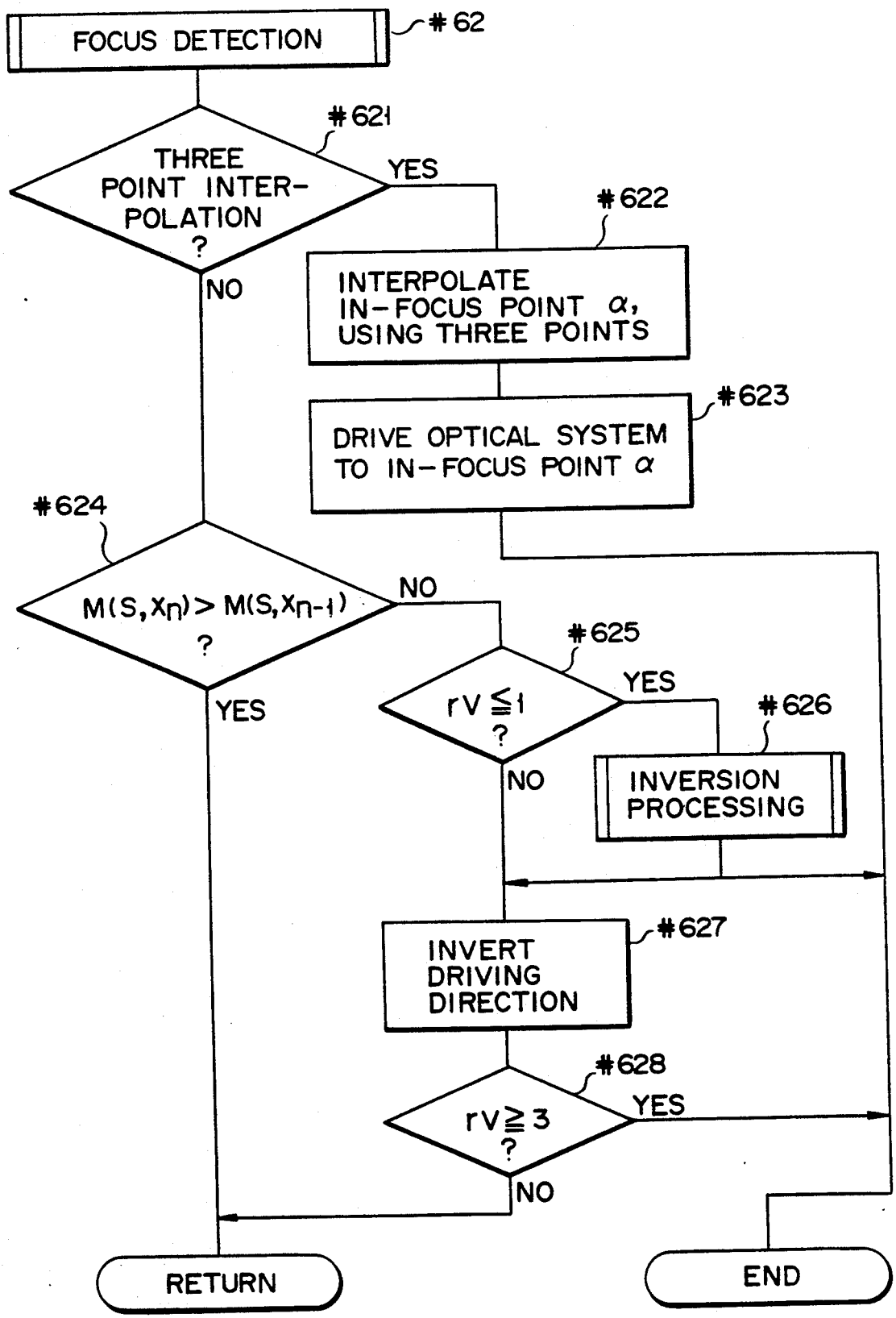
F I G. 19

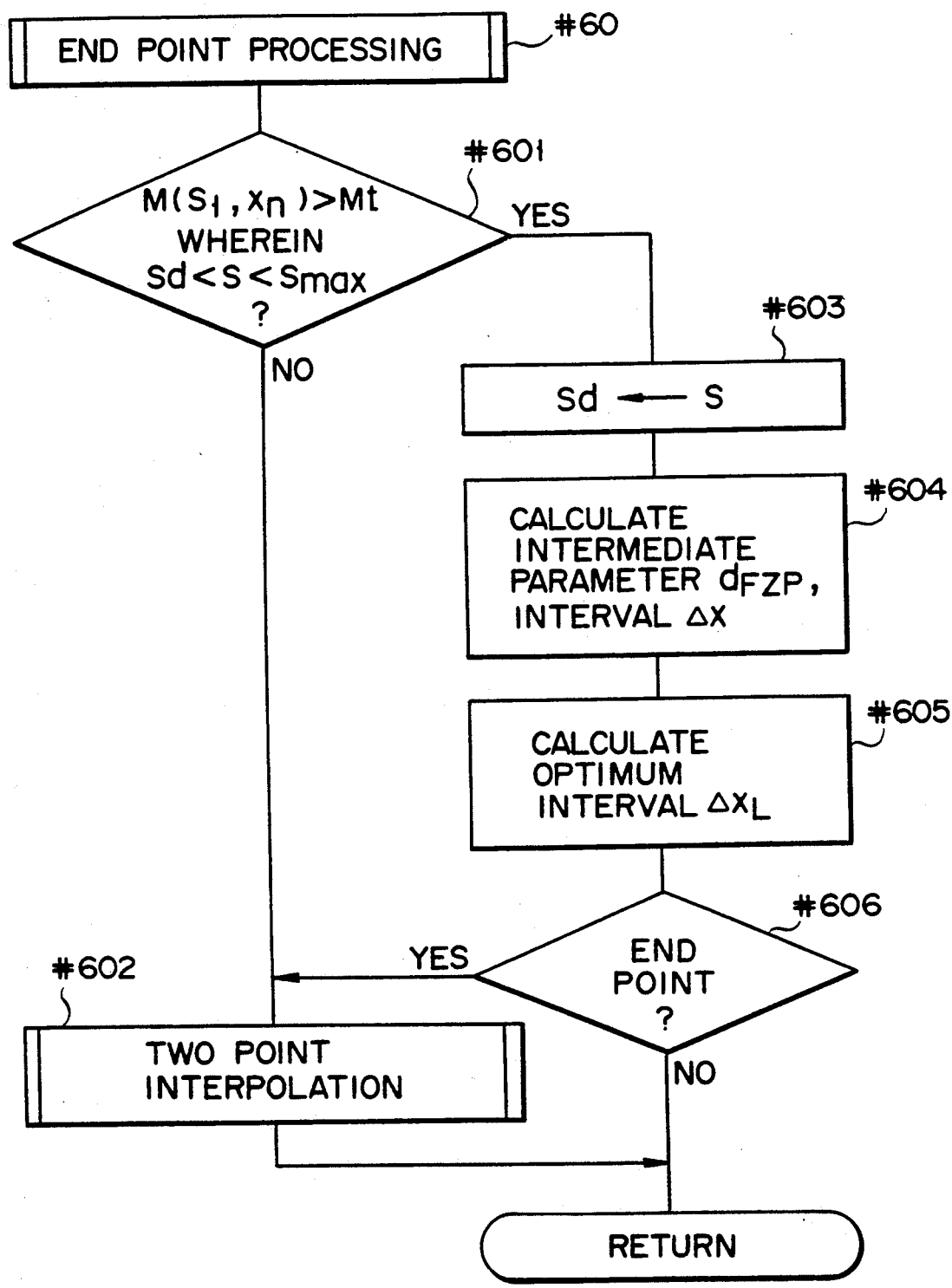
F I G. 22

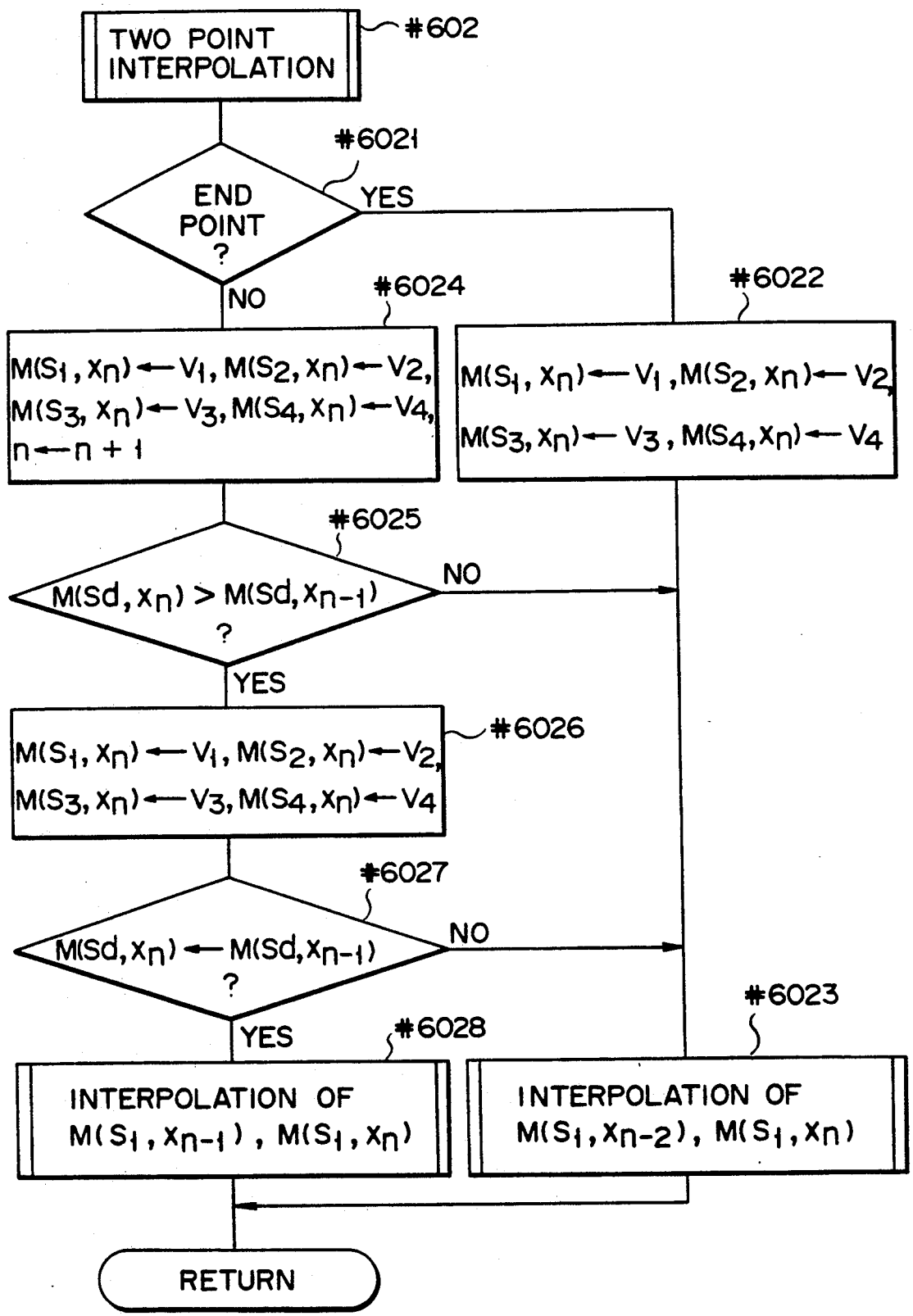
F I G. 24

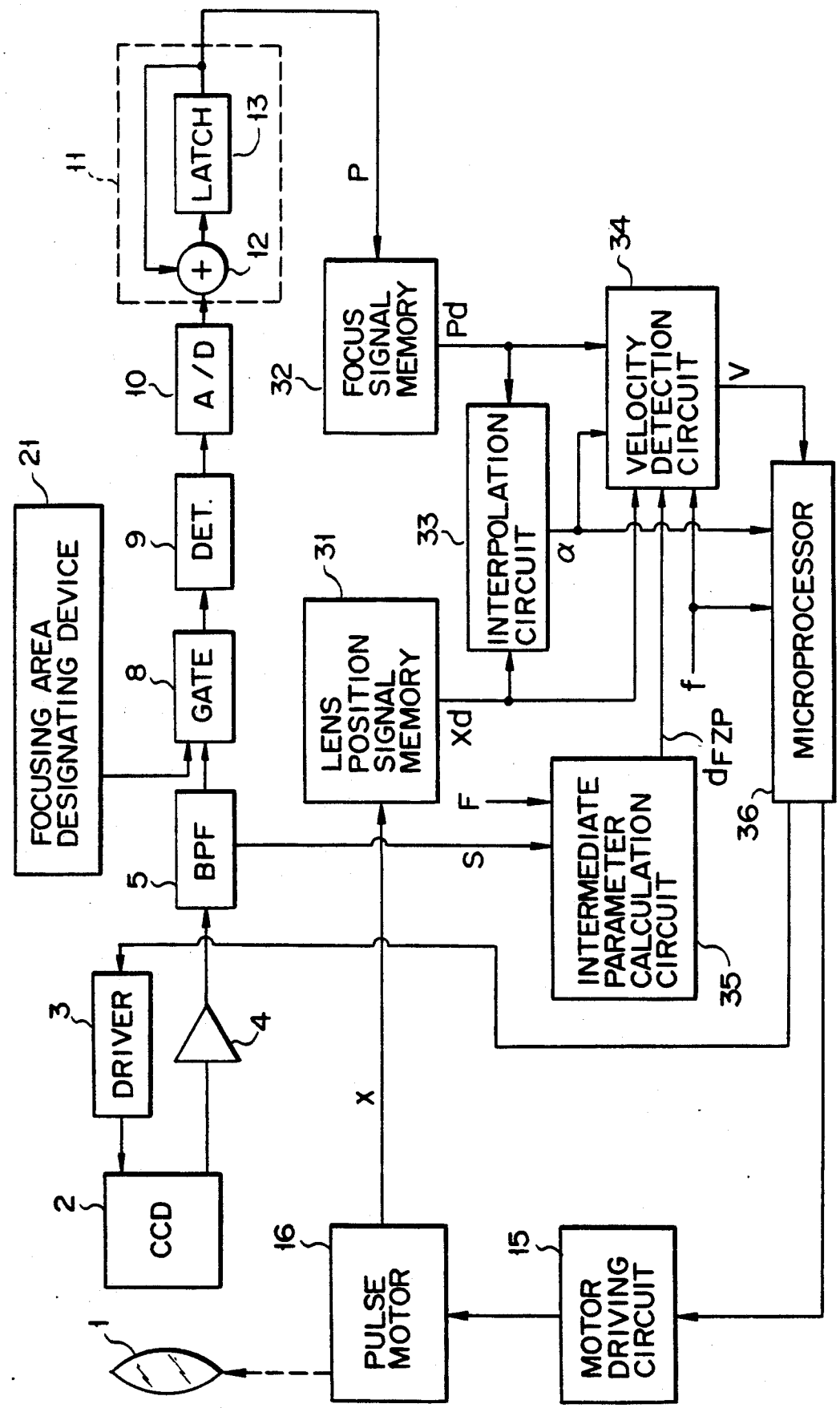
F I G. 26

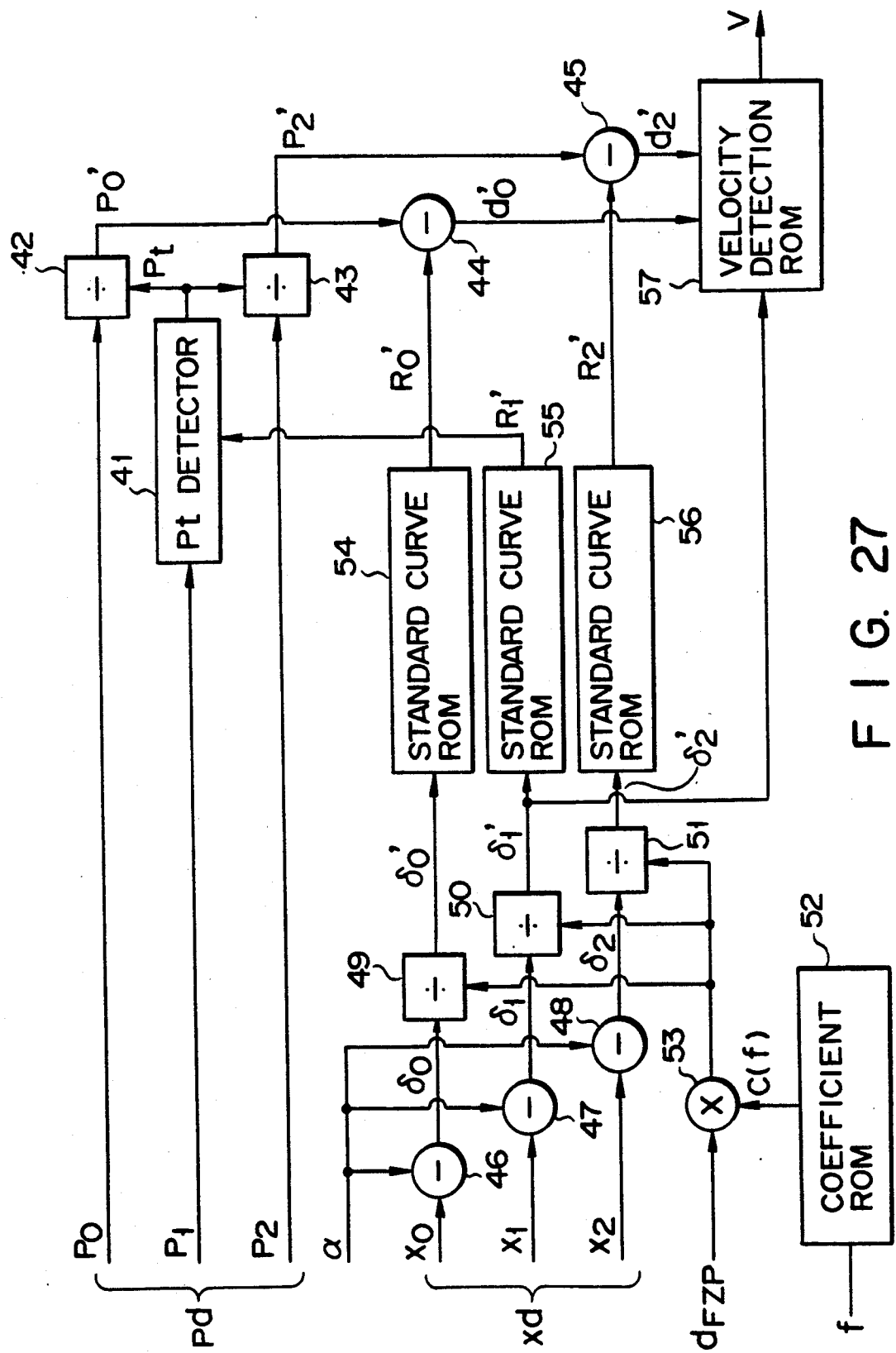
F I G. 27

AUTO-FOCUSING APPARATUS

BACKGROUND OF THE INVENTION

1. Field of the Invention

The present invention relates to an auto-focusing apparatus used for an electronic still camera, a video camera, a photographic camera, a telescope, and the like.

2. Description of the Related Art

As a conventional auto-focusing apparatus, an apparatus disclosed in "Automatic Focus Adjustment of Hill-Climbing Servo Scheme in TV Camera", NHK Technical Research, Vol. 17, No. 1, Serial No. 86, 1965, pp. 21-37 is known. In the hill-climbing servo scheme, a predetermined frequency component is extracted from a video signal obtained by a TV camera, and a photographing optical system is moved to a position where the amount of the image signal of the extracted frequency component exhibits the maximum, thereby performing focus adjustment. The hill-climbing scheme requires no special optical component for focus adjustment and hence allows a reduction in size of the apparatus. In addition, a high-precision focusing operation can be performed regardless of the pattern of an object to be photographed.

In the hill-climbing scheme, however, an optical system hunts near an in-focus point, resulting in a low focusing speed. In order to solve this problem, the present applicant has already filed a patent application associated with an auto-focusing apparatus for calculating an in-focus point by interpolation processing based on image signal values at several points near the in-focus point (U.S. Pat. application Ser. No. 485,646, filed Feb. 27, 1990).

This auto-focusing apparatus will be briefly described below with reference to FIGS. 1 to 3. As shown in FIG. 1, in the auto-focusing apparatus, an optical image of an object to be photographed (not shown) obtained by a photographing optical system 1 is incident on a light-receiving surface of a charge coupled device (to be referred to as a CCD hereinafter) 2 as a two-dimensional imaging device. It is to be noted that the two-dimensional imaging device is not limited to a CCD. For example, a metal-oxide semiconductor (to be referred to as an MOS hereinafter) may be used. Furthermore, a solid-state imaging device need not necessarily used, but an imaging tube or the like may be used. Charges generated by the irradiation of the object image light onto the CCD 2 are stored in the CCD 2. The charges are then read from the CCD 2 as an image signal every predetermined time interval in response to read signals supplied from a driver 3. The image signal is input to a band-pass filter (to be referred to as a BPF hereinafter) 5 and a pre-metering circuit 6 through an amplifier 4.

The pre-metering circuit 6 determines a charge storage time of the CCD 2, which allows proper exposure. The resultant time signal is supplied to a microprocessor 7. The microprocessor 7 supplies a command signal to the driver 3 on the basis of the time signal, thus controlling the charge storage time for proper exposure.

Meanwhile, the image signal component of a specific frequency band is extracted from the image signal input to the BPF 5 and is supplied to a gate 8. The gate 8 extracts only a signal component associated with a target in-focus region from the image signal of one frame and supplies it to a detector 9. The detector 9 is formed of, e.g., a square detector for detecting the square sum of signals and detects the amplitude of the signal component associated with the target in-focus region and supplies it to a digital integrator 11 through an A/D converter 10.

The digital integrator 11 is formed of an adder 12 and a latch 13. Signal values input to the digital integrator 11 are sequentially added together to output a specific frequency component value (to be referred to as a focus signal value hereinafter). This focus signal value corresponds to a degree of focusing. A focus signal $f(x)$ is generated from a plurality of focus signal values at each position of the optical system 1. That is, x of the focus signal $f(x)$ represents the position of the photographing optical system 1 in the direction of the optical axis. The focus signal $f(x)$ is supplied to the microprocessor 7. The microprocessor 7 stores the focus signal $f(x)$ in a memory 14. The microprocessor 7 executes an in-focus point detecting operation by using the focus signal $f(x)$ to generate a driving control signal. The driving control signal is supplied to a motor driving circuit 15. The motor driving circuit 15 controls a pulse motor 16 for moving the photographing optical system 1 in the direction of the optical axis so as to perform focus adjustment.

An operation of the conventional apparatus having the above-described arrangement will be described below. It is assumed that the interlace scheme is employed for imaging the object, and image signals are obtained as field image signals. Field image signals are read from the CCD 2 every field period. The pre-metering circuit 6 determines a proper charge storage time from the first field image signal and supplies the charge storage time data to the microprocessor 7. Subsequently, the microprocessor 7 controls the driver 3 in accordance with the determined storage time, thus supplying read signals to the CCD 2 in a predetermined cycle. Meanwhile, the motor driving circuit 15 causes the pulse motor 16 to drive the photographing optical system in a given direction. In this case, the moving speed is constant. At this time, the image signals read from the CCD 2 are formed into the focus signal $f(x)$ through the BPF 5, the gate 8, the detector 9, the A/D converter 10, and the digital integrator 11. In this manner, the focus signals $f(x)$ are obtained at predetermined time intervals in the process of the movement of the photographing optical system 1, that is, the focus signal $f(x)$ is obtained every time the optical system 1 is moved by a predetermined distance. The microprocessor 7 drives the photographing optical system 1 in the direction to increase the level of the focus signal $f(x)$.

FIG. 2 shows the focus signal $f(x)$ in a form of a combination of discrete signal values obtained in this manner. FIG. 3 is an enlarged view of a portion Q near the maximum value of the focus signal curve shown in FIG. 2. The microprocessor 7 calculates a position $\alpha$ of the optical system 1 at which a peak value $P_x (= f(\alpha))$ of the focus signal is obtained by interpolation processing based on the following formulas using a maximum point $P_1 (= f(x_m))$ and two points $P_0 (= f(x_{m-1}))$ and $P_2 (= f(x_{m+1}))$ on both sides thereof of the sample values of the focus signals:

If $P_0 \leq P_2$, $$\alpha = x_m - (\Delta x/2)(P_0 - P_2)/(P_1 - P_2) \tag{1a}$$

If $P_0 < P_2$, $$\alpha = x_m + (\Delta x/2)(P_2 - P_0)/(P_1 - P_0) \quad (1b)$$

where $x_m$ is the position of the optical system 1 at which the maximum value $P_1$ is obtained, and $\Delta x$ is the distance (sampling interval) at which the optical system 1 moves for a predetermined period of time.

When the photographing optical system 1 is moved to the in-focus point $\alpha$ calculated by the interpolation processing based on equation (1a) or (1b), focus adjustment is completed.

In this method, if the sampling interval $\Delta x$ is increased, the number of times of sampling (detection) of the focus signals f(x) can be reduced to increase the focusing speed. However, since an in-focus position is detected by interpolation processing, if the sampling interval $\Delta x$ is increased, an error due to interpolation is increased, resulting in poor focusing precision. In contrast to this, in this interpolation scheme, if the sampling interval $\Delta x$ is too small, the detection of an in-focus position tends to be influenced by noise. This also adversely affects focusing precision. As described above, in the conventional method, a sampling interval which minimizes an error cannot be determined, and it is difficult to balance focusing precision and speed.

SUMMARY OF THE INVENTION

Accordingly, it is an object of the present invention to provide an auto-focusing apparatus for obtaining an in-focus point by interpolation, which can set an optimum sampling interval for data acquisition and can detect an in-focus point at high speed with high precision.

According to the present invention, there is provided an auto-focusing apparatus comprising:

an optical system for obtaining an optical image of an object;

means for imaging the optical image and outputting an image signal;

driving means for moving at least one of the imaging means and the optical system along a direction of an optical axis;

filter means for extracting a predetermined frequency component from the image signal output from the imaging means;

detecting means for detecting an output signal of the filter means and generating a focus signal representing a focusing degree of the optical image obtained by the optical system, which is a function of relative positions of the imaging means and the optical system;

means for obtaining an intermediate parameter which characterizes a functional curve of a focus signal on the basis of the predetermined frequency component extracted by the filter means and an F-number of the optical system;

means for determining a sampling interval on the basis of a constant representing a detection scheme of the detecting means and the intermediate parameter; and means for obtaining an in-focus point by sampling the focus signal every sampling interval and interpolating a plurality of sample signal values while at least one of the optical system and the imaging means is moved by the driving means.

According to the present invention, an intermediate parameter for characterizing a focus signal curve is detected from respective parameters. A sampling interval is determined on the basis of the intermediate parameter. Focus signals are sampled every sampling interval while at least one of the optical system and the imaging means is moved. An in-focus point can be obtained by interpolating focus signals at three or two points. Therefore, an in-focus point can be accurately obtained at high speed.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 4 is a view showing parameters, of an optical system, used for defining an intermediate parameter, which constitutes a characteristic feature of the present invention;

FIG. 5 is a graph showing a relationship between modulation transfer function (MTF) values and spatial frequencies;

FIG. 6 is a graph showing a relationship between MTF values and an amount of defocus;

FIG. 12 is a view showing a procedure for setting an optimum sampling interval;

FIG. 13 is a graph for explaining a principle of two point interpolation for obtaining an in-focus point;

FIG. 14 is a block diagram showing an arrangement of a first embodiment of an in-focus point detecting circuit according to the present invention;

FIG. 15 is a block diagram showing an arrangement of an auto-focusing apparatus according to the first embodiment of the present invention;

FIG. 16 is a flow chart showing the overall auto-focusing procedure according to the first embodiment;

FIG. 19 is a flow chart showing an in-focus point detection subroutine in FIG. 18;

FIG. 22 is a flow chart showing an end point processing subroutine in FIG. 18;

FIG. 24 is a flow chart showing a two point interpolation subroutine in FIG. 22;

FIG. 26 is a block diagram showing arrangement of an auto-focusing apparatus of a second embodiment according to the present invention;

FIG. 27 is a block diagram showing a detailed arrangement of a velocity detector in FIG. 26;

DETAILED DESCRIPTION OF THE PREFERRED EMBODIMENT

Figure 1:
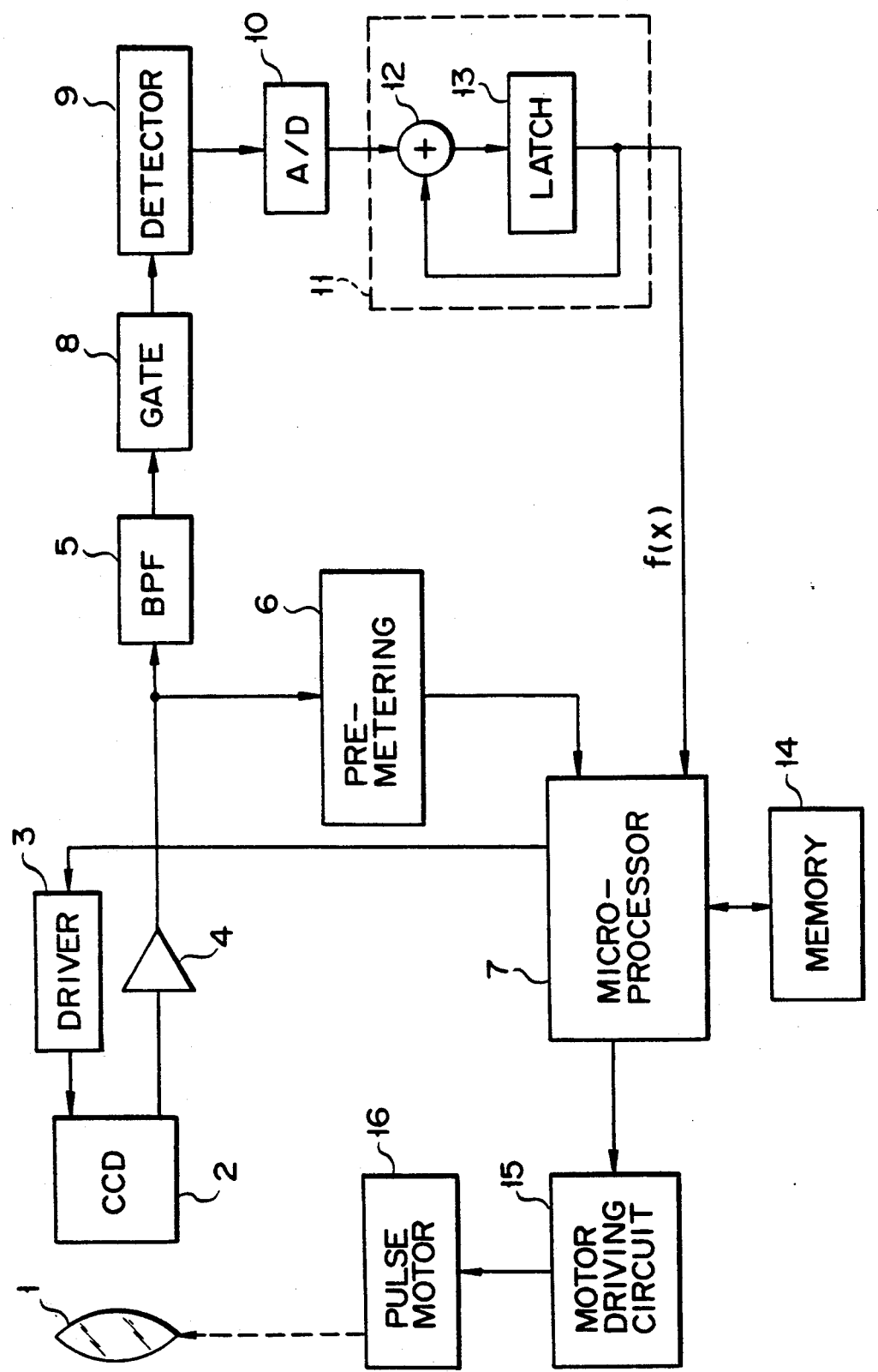
FIG. 1 is a block diagram showing a conventional auto-focusing apparatus.
Figure 2:
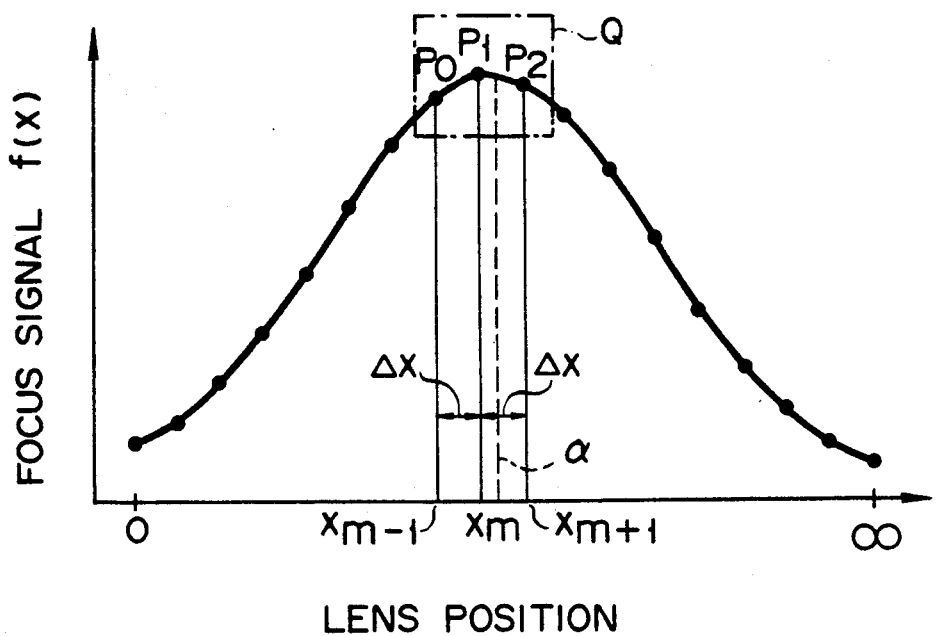
FIG. 2 is a graph showing a focus signal curve obtained by the conventional apparatus.
Figure 3:
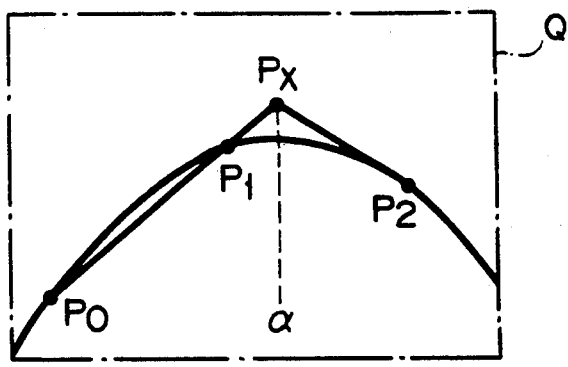
FIG. 3 is a view for explaining a principle of interpolation processing for obtaining an in-focus point in the conventional apparatus.

A preferred embodiment of an auto-focusing apparatus according to the present invention will now be described with reference to the accompanying drawings. According to the present invention, an intermediate parameter which characterizes a functional graph (curve) of a focus signal representing a focusing degree in relation to the position of an optical system is calculated from various parameters of the apparatus, and an optimum sampling interval for focus detection processing based on interpolation is determined on the basis of the intermediate parameter. While the position of the optical system is changed along the direction of the optical axis, focus signals are sampled in accordance with the optimum sampling interval. An in-focus point detecting operation is then performed by interpolation on the basis of three or two sample values and the sampling interval.

An intermediate parameter will be described first. FIG. 4 shows various types of parameter of the optical system. Referring to FIG. 4, reference symbol O denotes an object to be focused; I, an imaging point of an lens L; f, the focal length of the lens L; A, the diameter of aperture of the lens L; a, an object distance; b, an imaging distance; $\delta$, the diameter of blur circle; and d, a defocus amount. In FIG. 4, the following relation is established in a near field region:

$$(1/a)+(1/b)=1/f \qquad (2)$$

In addition, the following relation is established according to similarity conditions:

$$A/\delta = b/d \qquad (3)$$

According to equations (2) and (3), therefore, the diameter $\delta$ of the blur circle can be represented as follows:

$$\delta = (a-f)d/F \qquad (4)$$

where F is the F-number (=f/A) of the lens L.

In addition, a modulation transfer function (to be referred to as a MTF hereinafter) of an optical system is generally represented as follows:

$$MTF(S) = \frac{2J_1(\delta\pi S)}{\delta\pi S} \qquad (5)$$

where $J_1$ is a Bessel function of first kind, order one, and S is a spatial frequency (mm$^{-1}$) determined by the frequency band of an BPF for extracting a frequency component of the focus signal. Therefore, if the diameter $\delta$ of the blur circle is constant, the MTF(S) can be represented by the curve shown in FIG. 5 which periodically exhibits positive and negative values. Referring to FIG. 5, reference symbol S denotes a spatial frequency in which the MTF value becomes 0 for the first time. A condition for S1 is represented by the following relation in accordance with Bessel function characteristics:

$$\delta\pi S \approx 3.832 \qquad (6)$$

According to equations (4) and (6), the defocus amount d at which the MTF value becomes 0 is given by:

$$d = (3.832/\pi)a \cdot F/(a-f)S \qquad (7)$$

In general, since (object distance a)>>(focal length f), a/(a - f)∓1 in equation (7). Therefore, equation (7) is rewritten as follows:

$$\begin{aligned} d &= (3.832/\pi)F/S \\ &= 1.22F/S \\ &= d_{FZP} \end{aligned} \qquad (8)$$

Since the diameter $\delta$ of blur circle is proportional to the defocus amount d according to equation (4), it can be easily estimated from equation (5) that changes in MTF as a function of the defocus amount d are similar to those as a function of the spatial frequency S. FIG. 6 shows an MTF(d) as a function of the defocus amount d when the spatial frequency S is set to be constant. FIG. 5 shows an MTF(S) when the defocus amount d is set to be constant. Therefore, the value d represented by equation (8) coincides with a value d1 in FIG. 6. Since FIG. 6 shows the MTF value as a function of the defocus amount d, the MTF curve coincides with the function curve of the focus signal f(x) described above. The focus signal f(x) obtained by detecting the square sum of the image signals as described above is denoted by a broken curve in FIG. 6. The following description is based on the assumption that the focus signal is obtained by square detection of the image signals.

The defocus amount d calculated from equation (8) is an intermediate parameter which characterizes the focus signal curve. With a defocus amount larger than the defocus amount d, the focus signal value becomes substantially zero. This intermediate parameter is defined as $d_{FZP}$ (FZP: First Zero Point). That is, the waveform of the focus signal curve can be known from the intermediate parameter $d_{FZP}$ determined by the F-number F and the spatial frequency S, and the intermediate parameter $d_{FZP}$ is proportional to the F-number and is inversely proportional to the spatial frequency S.

Figure 7:
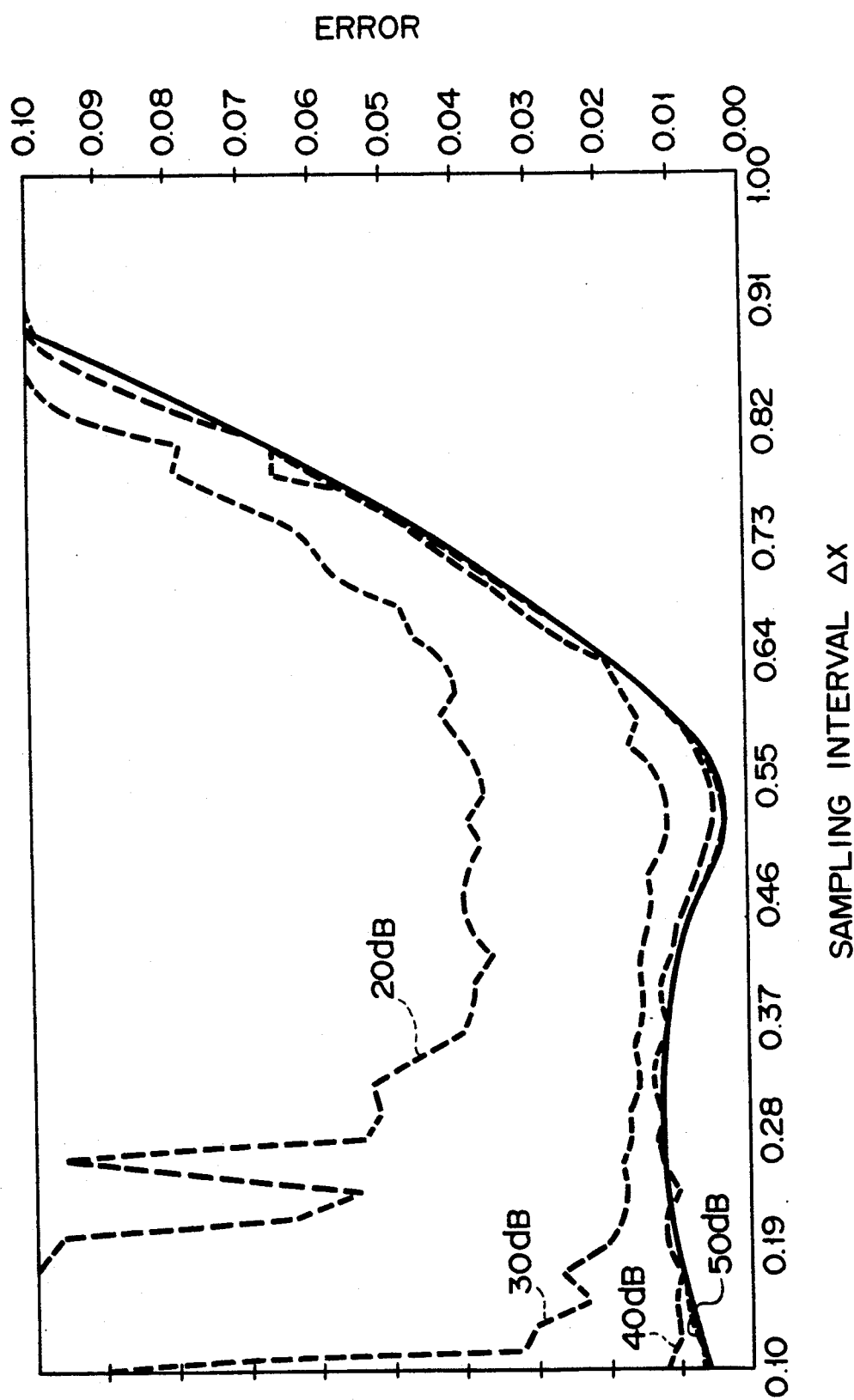
FIG. 7 is a graph showing a relationship between focusing errors and sampling intervals in three point interpolation.

A method of determining an optimal sampling interval $\Delta x$ on the basis of the intermediate parameter $d_{FZP}$ will be described below. FIG. 7 is a graph showing errors between a real in-focus point and in-focus points obtained by the above-mentioned three point interpolation processing represented by equations (1a) and (1b) in relation to the focus signal curve having the waveform (a square of equation (5)) represented by the broken curve in FIG. 6. Referring to FIG. 7, the sampling interval $\Delta x$ is plotted along the axis of abscissa, which is normalized with intermediate parameter $d_{FZP}$ and focusing error is plotted along the axis of ordinate, which is also normalized with the intermediate parameter $d_{FZP}$. FIG. 7 shows relationships between the sampling interval $\Delta x$ and the focusing error with no noise (solid curve) and signal-to-noise (S/N) ratios of 50 dB, 40 dB, 30 dB, and 20 dB (broken curves), respectively. When no noise is present, the curve represents the intrinsic errors included in interpolation processing. In this case, with an increase in the sampling interval $\Delta x$, the focusing error is increased. If the noise is increased, and the S/N ratio is decreased, a focusing operation is increasingly influenced by the noise with a decrease in the sampling interval $\Delta x$. As a result, the focusing error is increased. Therefore, the optimal sampling interval $\Delta x$ is determined in accordance with the intrinsic errors included in interpolation processing and an influence of the noise. As shown in FIG. 7, with any S/N ratio, the minimum errors are obtained near $\Delta X \approx 0.52 d_{FZP}$. Therefore, the optimal sampling interval $\Delta x$ can be represented as follows:

$$\Delta x = C_{OPT} \cdot d_{FZP} \quad (9)$$

where $C_{OPT}$ is a constant determined by a detection scheme of the focus signal. When the square sum detection scheme is employed, $C_{OPT} = 0.52$, as shown in FIG. 7.

In addition, as shown in FIG. 7, since a focusing error is proportional to the intermediate parameter $d_{FZP}$, the focusing precision may be improved by decreasing the F-number or increasing the spatial frequency S. The spatial frequency S, however, cannot be unlimitedly increased, because noise is increased with an increase in the spatial frequency S. The F-number is preferably set to the full-aperture value of the optical system in order to allow an increase in amount of light to be received and imaged.

A setting operation of the optimal spatial frequency (the band of the BPF) S will be described below. An imaging range defined by the imaging point I shown in FIG. 4 greatly varies depending on the focal length f. Since the minimum imaging distance (when the object distance $= \infty$) is f, and the maximum imaging distance when the object distance is a closest distance amin is represented by $a_{min} \cdot f / (a_{min} - f)$, an imaging range L is represented by:

$$L = a_{min} \cdot f / (a_{min} - f) - f \quad (10)$$

For example, with $a_{min} = 0.75$ m, if $f = 35$ mm, $L = 1.713$ mm, and if $f = 70$ mm, $L = 7.205$ mm. That is, when the moving range of the optical system is changed with a change in the focal length f, the movement of the imaging point with a movement of the optical system is also changed depending on the focus length f. Therefore, the scale of the abscissa axis of the focus signal f(x) curve is changed depending on the focal length f.

Figure 8:
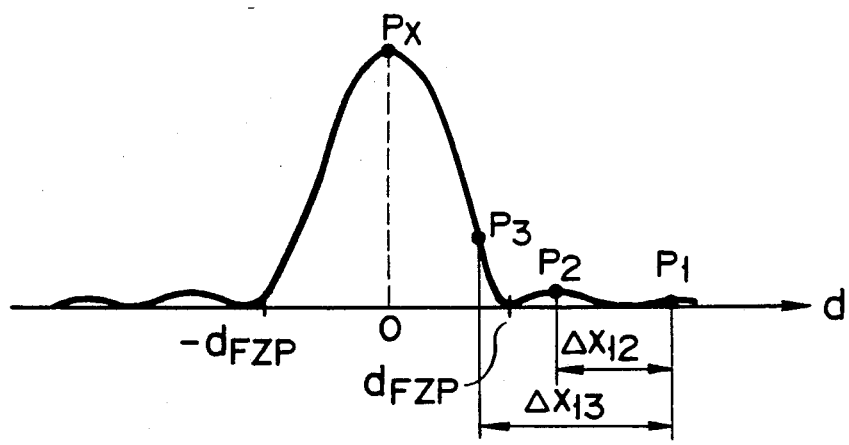
FIG. 8 is a graph for explaining limitations of sampling intervals.

In order to properly determine a defocus direction on the basis of focus signal values at two points under any conditions, one of the two points must be located within $d_{FZP}$ from an in-focus point. This will be described below with reference to FIG. 8. Referring to FIG. 8, two points $P_1$ and $P_2$ are separated from an in-focus point Px by a distance corresponding to $d_{FZP}$ or more, whereas a point $P_3$ is located within $d_{FZP}$. It is assumed that a focus signal at the point $P_1$ is sampled, and a focus signal at the point $P_2$ is subsequently sampled, i.e., a sampling interval $\Delta x_{12}$ is set. In this case, since $P_1 \approx P_2$, the direction of the in-focus point cannot be determined. If, however, the points $P_1$ and $P_3$ are used, i.e., a sampling interval $\Delta x_{13}$ is set, since $P_1 < P_3$, it can be determined that the point $P_3$ is located closer to the in-focus point than the point $P_1$ and the focusing direction coincides with the direction of the point $P_3$. For this reason, limitations are imposed on a sampling interval, and the intermediate parameter $d_{FZP}$, i.e., a frequency band S of the BPF, must be set to satisfy the limitations.

Figure 9:
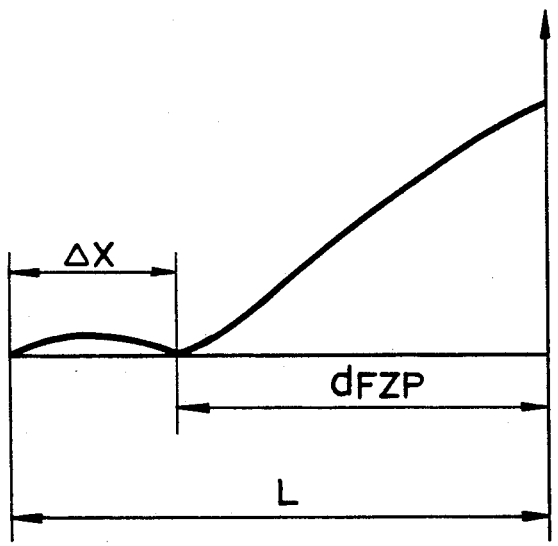
FIG. 9 is a view showing a first condition for setting the frequency band.
Figure 10:
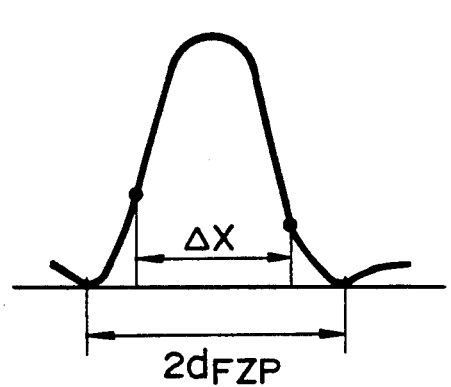
FIG. 10 is a view showing a second condition for setting the frequency band.

If, for example, extreme cases shown in FIGS. 9 and 10 are considered, the following conditions are required:

$$d_{FZP} \geq L - \Delta x \quad (11)$$

$$\Delta x \leq 2 d_{FZP} \quad (11a)$$

The in-focus point is detected while the lens is moved by a constant speed and the focus signal is sampled for every field period ($= \Delta x$). When the lens is moved at the maximum speed and the moving distance of the focusing point of the lens is $Vd_{max}$, $\Delta x = Vd_{max}$. Therefore, a substitution of equation (8) into relations (11) and (11a) yields:

$$1.22 F/S \geq L - Vd_{max}$$

$$Vd_{max} \leq 2(1.22 F/S)$$

The above two conditions can be rewritten in relation to the spatial frequency S as follows:

$$S \leq 1.22 F/(L - Vd_{max}) \quad (12)$$

$$S \leq 2.44 F/Vd_{max} \quad (12a)$$

Of these two conditions, condition (12) is preferentially used when $Vd_{max} \leq (2/3) L$, and condition (12a) is preferentially used when $Vd_{max} > (2/3) L$. The maximum value of the frequency S is defined as a standard frequency $S_B$. Frequencies lower than this standard frequency $S_B$ are used.

Figure 11:
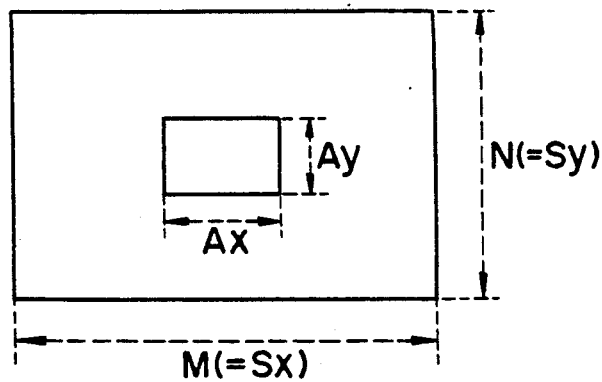
FIG. 11 is a view showing a focusing area in one frame.

The maximum frequency which can be used is limited by the size of a target in-focus region (to be referred to as a focusing area hereinafter) This will be described below. As shown in FIG. 11, if the number of pixels of an imaging device is represented by $M \times N$; the number of pixels of the focusing area, $Ax \times Ay$; and the size (mm) of the imaging device, $Sx \times Sy$, a minimum frequency $S_{min}$ (mm$^{-1}$) is represented as follows, provided that the BPF is a horizontal one-dimensional filter:

$$S_{min} = (Sx \cdot Ax/M)^{-1} \qquad (13)$$
$$= M/(Sx \cdot Ax)$$

It is to be noted that since the minimum frequency $S_{min}$ must be lower than the standard frequency $S_B$, the following limitation is imposed on the focusing area Ax:

$$Ax \geq M/(S_B \cdot Sx) \qquad (14)$$

The maximum frequency $S_{max}$ (mm$^{-1}$) which can be detected is represented by:

$$S_{max} = (1/2)(Sx/M)^{-1} \qquad (15)$$
$$= M/(2 \cdot Sx)$$

It is to be noted that M and Sx are set to satisfy $S_B < S_{max}$.

The frequency band of the BPF is set within limitations set in the above-described manner. Furthermore, in practice, a frequency band in which small noise is present must be selected, so that the frequency S at which the focus signal having the maximum level appears is selected within the limitations, and the optimal sampling interval Δx is finally obtained.

A procedure for obtaining this optimal sampling interval Δx will be described below with reference to FIG. 12. If the focusing area size Ax is fixed, the following three types of parameters are used: the focal length f of the optical system; the F-number of the optical system; and the pattern of an object to be focused (focus signals at the respective frequencies). The intermediate parameter $d_{FZP}$ is obtained from the selected band S of the BPF and the F-number. The optimal sampling interval Δx can be obtained by multiplying the intermediate parameter $d_{FZP}$ by a constant $C_{OPT}$ in accordance with a detection scheme.

More specifically, the imaging range L is obtained from the closest distance amin and the focal length f of the optical system according to equation (10). The standard frequency $S_B$ is then obtained from the obtained imaging range L, the F-number of the optical system, and the maximum moving distance of a focal plane $Vd_{max}$ according to relations (12) and (12a). Meanwhile, a minimum frequency $S_{min}$ is obtained from the focusing area size Ax, the imaging device size Sx, and the number M of pixels of the imaging device according to equation (13).

Subsequently, the frequency S at which $S_{min} \leq S$ is satisfied and a focus signal having the maximum level appears is obtained from the focus signals f(x) at the respective frequencies of the object. The intermediate parameter $d_{FZP}$ is obtained from the frequency S and the F-number of the optical system.

The intermediate parameter $d_{FZP}$ is multiplied by the constant $C_{OPT}$ based on a detection scheme, and in-focus point detection processing is executed by using the multiplication result as the optimal sampling interval Δx.

If high-frequency components are increased in amount when the in-focus point detection processing started, the band of the BPF needs to be switched to the high-frequency side in order to improve the focusing precision. In this case, an optimal sampling interval can be easily obtained by simply obtaining an intermediate parameter in accordance with equations (8) and (9), thus enabling high-precision focus adjustment at high speed.

Equations (8) and (9) are very simple and hence allow high-speed calculations. If, however, the processing speed is to be further increased, a table of spatial frequencies, F-numbers, and detection constants $C_{OPT}$ may be formed in advance so that an optimal sampling interval can be obtained by reading information from the table.

It is to be noted that the value Δx is the moving distance of the focal plane of the imaging device, which does not necessarily coincide with the moving distance of the optical system. However, these distances are in proportion to each other, so that the moving distance Δx can be easily converted into the moving distance of the optical system by multiplying the distance Δx by a proportional coefficient.

Another application associated with in-focus point detection using the intermediate parameter $d_{FZP}$ will be described below. In the above-described interpolation, three points are used. However, three points cannot be obtained in some case, e.g., a case wherein the lens is located at the closest end position or the infinite end position. According to the present invention, in order to deal with such a case, interpolation processing based on two points is also performed. Two point interpolation may be performed not only in a case wherein data at three points cannot be obtained when the lens is located at the closet end position or the infinite end position, but also in a case wherein data at three points can be obtained. A method of detecting an in-focus point from two points $P_0$ and $P_1$ located on both sides of an in-focus point Px as shown in FIG. 13 will be described below. Referring to FIG. 13, the axis of abscissa corresponds to the position of the optical system. If a defocus amount at the point $P_0$ is represented by $X_0$ and a defocus amount at the point $P_1$ is represented by $X_1$ (here, $X_0 | \alpha - x_0 |$, $X_1 | \alpha - x_1 |$, $\alpha$ is the in-focus point, $x_0$ is the position of the optical system corresponding to the point $P_0$, and $x_1$ is the position of the optical system corresponding to the point $P_1$), the MTF values at the two points $P_0$ and $P_1$ are represented by the following equations according to equation (5):

$$MTF(x_0) = \frac{2J_1(3.832x_0/d'_{FZP})}{3.832x_0/d'_{FZP}} \qquad (16a)$$

$$MTF(x_1) = \frac{2J_1(3.832x_1/d'_{FZP})}{3.832x_1/d'_{FZP}} \qquad (16a)$$

Here $d'_{FZP}$ is a distance of the optical system when the imaging plane is moved by $d_{FZP}$. Since the square sum detection scheme is used as a detection scheme, a ratio $R(x_0, x_1)$ of the MTF values at the two points is represented by:

$$R(x_0, x_1) = (MTF(x_1))^2/(MTF(x_0))^2 \qquad (17)$$
$$= (x_0 \cdot J_1(3.832x_1/d'_{FZP})/x_1 \cdot J_1(3.832x_0/d'_{FZP}))^2$$

The ratio $R(x_0, x_1)$ is solely determined by a combination of the two points, i.e., the distance between two points $1 (=x_0-x_1)$ and the distances $X_0$, $X_1$ from the in-focus point. If a defocus amount at a point ($x_0$ in this case) where a larger focus signal value is obtained is represented by D, the defocus amount can be inducibly obtained from the distance between the two points l and the ratio R. However, since it is difficult to analytically solve equation (17), numerical solution for equation (17) is performed to obtain the defocus amount D by referring to the table. In this case, if the distance between the two points and the distance D from the in-focus point are normalized by the intermediate parameter $d'_{FZP}$, the defocus amount D can be obtained from the same table regardless of the F-number and the band of the BPF. That is, $l'=l/d'_{FZP}$ and $D'=D/d'_{FZP}$ are set, as shown in FIG. 14. With this method, an in-focus point can be easily determined from two points located on both sides of the in-focus point. This method of detecting an in-focus point by using such two points will be called a two point interpolation method.

In addition, this table includes a region where no value is present depending on a combination of l' and R, and data read from this region cannot be used. For this reason, an error flag E is output as "1" in such a case. In a normal case, the error flag E is set at "0".

As described above, the intermediate parameter $d_{FZP}$ is very effective in characterizing the waveform of a focus signal curve.

The first embodiment of the present invention to which the above-described principle of focus detection is applied will be described below. FIG. 15 shows a hardware arrangement of the first embodiment. It is to be noted that the sam reference numerals in FIG. 15 denote the same parts as in FIG. 1 and a detailed description thereof will be omitted. In the photographing optical system 1, an F-number is represented by F; a lens position, x, and a focal length, f. Referring to FIG. 15, the lens position x is detected by a sensor (not shown) but may be provided by a pulse motor 16 or a motor driving circuit 15. In the photographing optical system 1, it is assumed that a moving distance d1 of the lens position x and a moving distance dp of the focal plane or imaging plane are in proportion to each other, as indicated by the following equation:

$$dl = C(f) \cdot dp \tag{18}$$

wherein the proportional coefficient C(f) is a function associated with the focal length f of the lens.

BPFs 5a to 5d respectively having band-pass frequencies $S_1$, $S_2$, $S_3$, $S_4$ ($S_1<S_2<S_3<S_4$) are connected in parallel with the output terminal of a preamplifier 4. The outputs of the BPFs 5a to 5d are respectively connected in series with gates 8a to 8d, detectors 9a to 9d, each constituted by a square detection circuit, A/D converters 10a to 10d, and digital integrators 11a to 11d. A focusing area designating device 21 is connected to each of the gates 8a to 8d to have a function of transmitting a command signal for extracting only signals of a target in-focus region from one frame of the image signal. Each of the detector 9a to 9d serves as a square detector. In addition, each of the digital integrators 11a to 11d is formed of an adder 12 and a latch 13. The integrators 11a to 11d respectively output focus signals $V_1$, $V_2$, $V_3$, $V_4$ to a microprocessor 22. The microprocessor 22 receives the focus signals $V_1$, $V_2$, $V_3$, $V_4$ for every field periods and performs an auto-focusing operation based on an algorithm shown in FIGS. 16 to 19, 21, 22, 24, 25. The microprocessor 22 also receives data associated with the lens position x, F-number F, and focal length f of the photographing optical system 1 which are required for focus adjustment. A ROM 23 is connected to the microprocessor 23. This ROM 23 is equivalent to the table ROM shown in FIG. 14. Although not shown, a pre-metering circuit is connected to the output terminal of the amplifier 4, similar to the conventional apparatus shown in FIG. 1, so as to determine a charge storage time corresponding to proper exposure. The output image signal of the pre-amplifier 4 is stored in a recording medium, such as a magnetic disk or magnetic tape.

An operation of the first embodiment having the above-described arrangement will be described below. When focus adjustment is started, a proper charge storage time is set by the pre-metering circuit, and an imaging operation is started by the CCD 2. Image signals are then read every field period, and specific frequency components are extracted through the BPFs 5a to 5d. Meanwhile, only signals from a focusing area within one frame are extracted by the gates 8a to 8d, and focus signal values $V_1$ to $V_4$ obtained through the detectors 9a to 9d, the A/D converters 10a to 10d, and the digital integrators 11a to 11d are input to the microprocessor 22.

When the photographing optical system 1 is moved from $x_\alpha$ to $x_\beta$ within one field period (charge storage time corresponding to one read cycle), the focus signal values $V_1$ to $V_4$ can be regarded as focus signal values at an intermediate position $x=(x_\alpha+x_\beta)/2$ of the photographing optical system 1. Therefore, the focus signal values are regarded as functions of the band S and the lens position x and are represented by $M(S, x)$. In this manner, focus signal values $M(S_i, x)$ ($i=1$ to 4) at four spatial frequencies $S_1$ to $S_4$ corresponding to the BPFs 5a to 5d are obtained every field period. In-focus point detection processing is performed by the above-described three or two point interpolation using these focus signal values.

Figure 17:
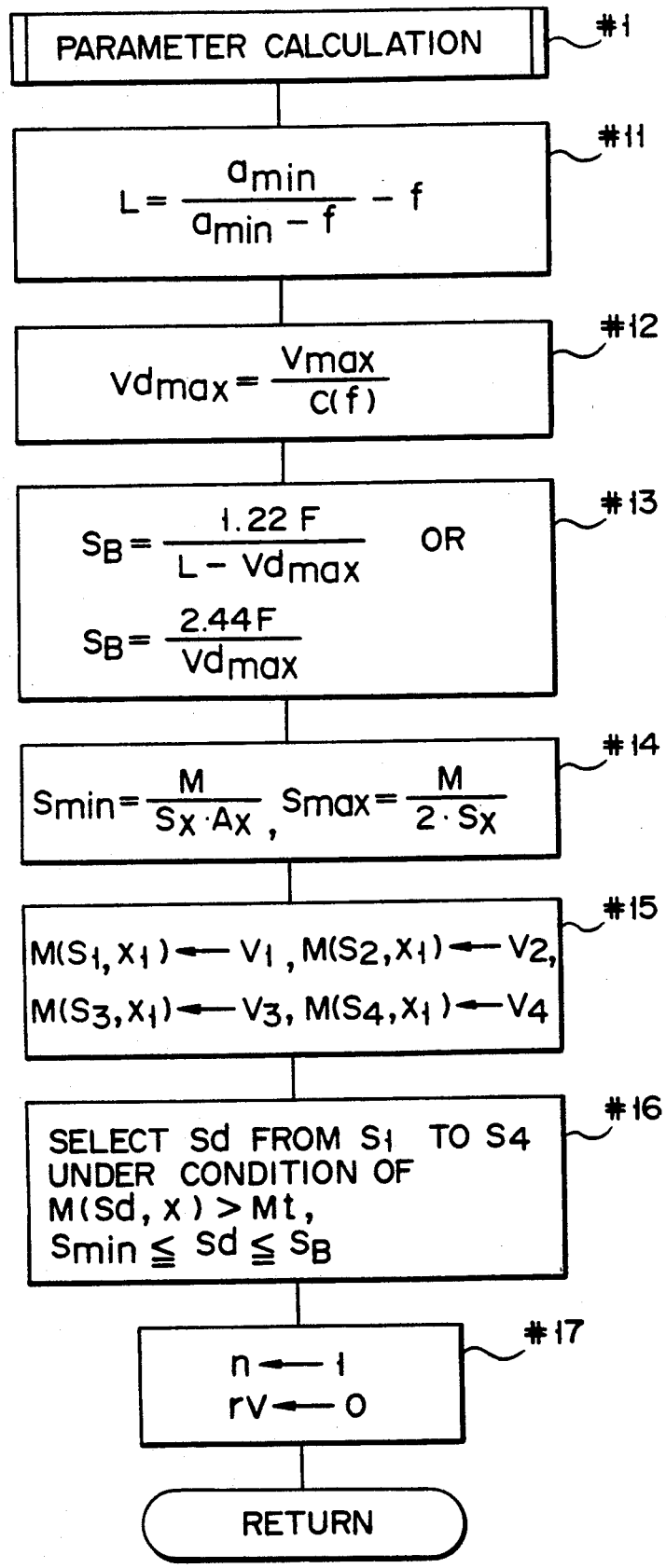
FIG. 17 is a flow chart showing a parameter calculation subroutine in FIG. 16.

In-focus point detection processing by the microprocessor 22 will be described below with reference to the flow charts shown in the accompanying drawings. FIG. 16 shows a main routine of auto-focusing. In step #1, a subroutine associated with calculation of parameters is executed. FIG. 17 shows this subroutine in detail. In step #11, an imaging range L is obtained according to equation (10). In step #12, a maximum moving distance $Vd_{max}$ of the focal plane is obtained from the maximum velocity $V_{max}$ of the focal plane and the coefficient C(f) in accordance with the equation (18). In step #13, the maximum moving distance $Vd_{max}$ is substituted into relations (12) and (12a) to calculate a standard frequency $S_B$. In step #14, a minimum frequency $S_{min}$ and a maximum frequency $S_{max}$ are obtained according to equations (13) and (15) In step #15, focus signal values $M(S_i, x_i)$ ($i=1$ to 4) are detected. In step #16, a maximum frequency Sd is selected from frequencies S which exceed a threshold value MT and satisfy $S_{min} \leq S \leq S_B$. Finally, in step #17, a total detection count n of focus signals is set to be 1 and a total inversion count rv of the optical system 1 is set to be 0. The threshold value Mt is set to select a band with small noise.

When the respective parameters are determined in this manner, the flow returns to the main routine in FIG. 16. In step #2, the intermediate parameter dFZP and the optimal sampling interval $\Delta x$ of the focal plane are calculated according to equations (8) and (9). In step #3, the optimal sampling interval $\Delta x_L$ ($=C(f) \cdot \Delta x$) of the position of the optical system 1 corresponding to the interval $\Delta x$ is obtained in accordance with equation (18). At this time, $d'_{FZP}(=C(f) \cdot d_{FZP})$ is obtained. Subsequently, the driving velocity of the photographing optical system 1 is controlled to obtain a focus signal every time the optical system 1 is moved by the distance $\Delta x_L$. That is, the photographing optical system 1 is moved by the distance $\Delta x_L$ in the field period of time.

In step #4, driving of the photographing optical system 1 is started. At this time, a driving direction may be arbitrarily set. If, however, the optical system 1 is driven in a direction to approach a standard focal length (an in-focus position at which photography is frequently performed), focus adjustment can be efficiently performed in many cases. In step #5, a subroutine for automatic focus adjustment is performed.

Figure 18:
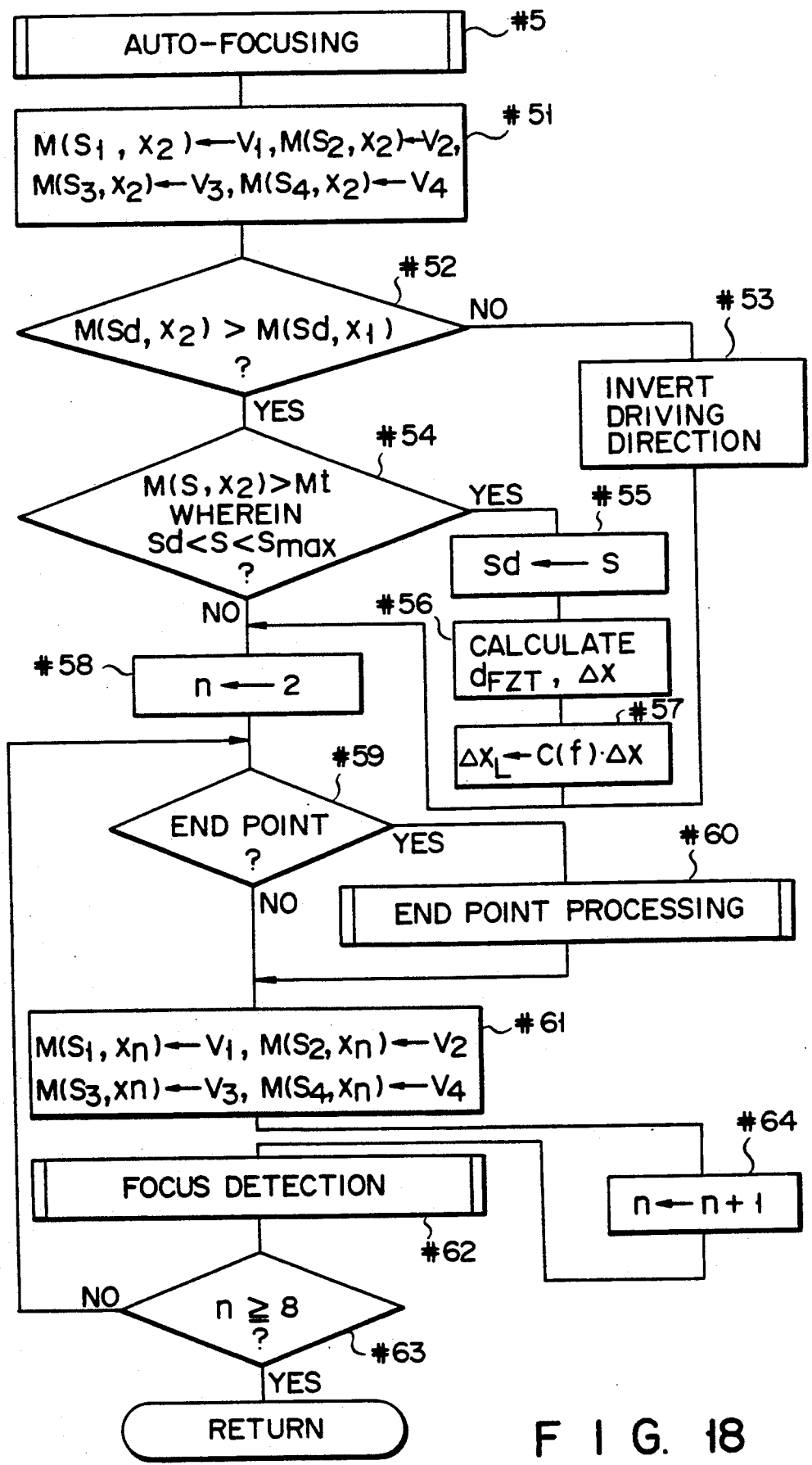
FIG. 18 is a flow chart showing an auto-focusing subroutine in FIG. 16.

FIG. 18 shows the automatic focus adjustment subroutine in step #5 in detail. In step #51, focus signal values $M(S_i, x_2)$ (i=1 to 4) at the time when the photographing optical system 1 is moved by the distance $\Delta x_L$ are detected. In step #52, focus signal values $M(S_d, x_1)$ and $M(S_d, x_2)$ in a current selected band $S_d$ are compared with each other to determine whether the focus signal value is increased or decreased. If the focus signal value is decreased, the driving direction of the photographing optical system 1 is inverted in step #53, and the flow advances to step #58. If the focus signal value is increased, the driving direction is not changed, and it is checked in step #54 whether the frequency band (BPF) can be switched to the high-frequency band. That is, it is checked whether a band S which satisfies $S_d < S < S_{max}$ and $M(S, x_2) > MT$ is present. If YES in step #54, the detection band $S_d$ is updated, and the intermediate parameter $d_{FZP}$ and the sampling interval $\Delta x$ are newly calculated in step #56. In step #57, a new sampling interval $\Delta x_L$ ($= C(f) \cdot \Delta x$) is obtained, and the flow advances to step #58. A change in the optimal sampling interval $\Delta x_L$ corresponds to a change in the driving velocity of the photographing optical system 1 by the pulse motor 16 because the read cycle (field period) of the CCD 2 is constant.

If NO in step #54, the count n is set to be 2 in step #58. In step #59, it is checked whether the photographing optical system 1 reaches an end point (infinite position or closest position) within the next exposure time. If YES in step #59, after end point processing (to be described later with reference to FIG. 22) is executed in step #60, the flow advances to step #61. If NO in step #60, new focus signal values $M(S_i, x_n)$ (i=1 to 4) are input in step #61, and a focus detection subroutine is performed in step #62. It is to be noted that if an in-focus point cannot be detected in the focus detection subroutine, the processing from step #59 is repeated, and if a focus detection count exceeds 8 times, an excessive detection count is determined to end the auto-focusing subroutine, and the flow returns to the original routine to end the focus detection processing.

The focus detection subroutine in step #62 will be described below with reference to FIG. 19. In step #621, it is checked whether three point interpolation can be performed. That is, it is checked whether the detection count $n \geq 3$ and detection intervals of three points are equal, i.e., $|x_n - x_{n-1}| = |x_{n-1} - x_{n-2}|$. If YES in step #621, an in-focus point $\alpha$ is calculated according to equation (1a) or (1b) in step #622. In step #623, the photographing optical system 1 is driven to the in-focus point $\alpha$, thus ending the focus detection processing.

If NO in step #621, focus signal values $M(S, x_n)$ and $M(S, x_{n-1})$ are compared in step #624 to determine whether the driving direction is a direction to approach the in-focus point (to be referred to as a forward direction hereinafter) or a direction to separate from the in-focus direction (to be referred to as a reverse direction hereinafter). If it is the forward direction, the flow returns to the original routine.

If it is the reverse direction, it is checked in step #625 whether the total inversion count rv is not larger than one. If YES in step #625, an inversion processing subroutine (to be described later with reference to FIG. 21) is executed in step #626. When this subroutine is completed, the flow advances to step #627 or the focus detection processing is completed. If NO in step #625, the driving direction is inverted in step #627. If, however, it is determined in step #628 that the total inversion count is three or more, it is determined that focus adjustment cannot be performed, thus ending the focus detection processing. If the total inversion count is not less than three, the flow returns to the original routine, i.e., the auto-focusing subroutine in step #63 in FIG. 18.

Figure 20:
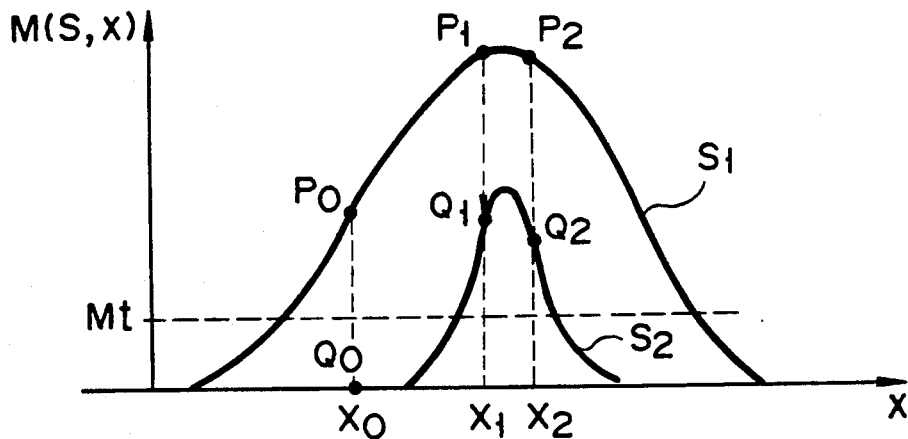
FIG. 20 is a graph for explaining a case wherein inversion processing is required.
Figure 21:
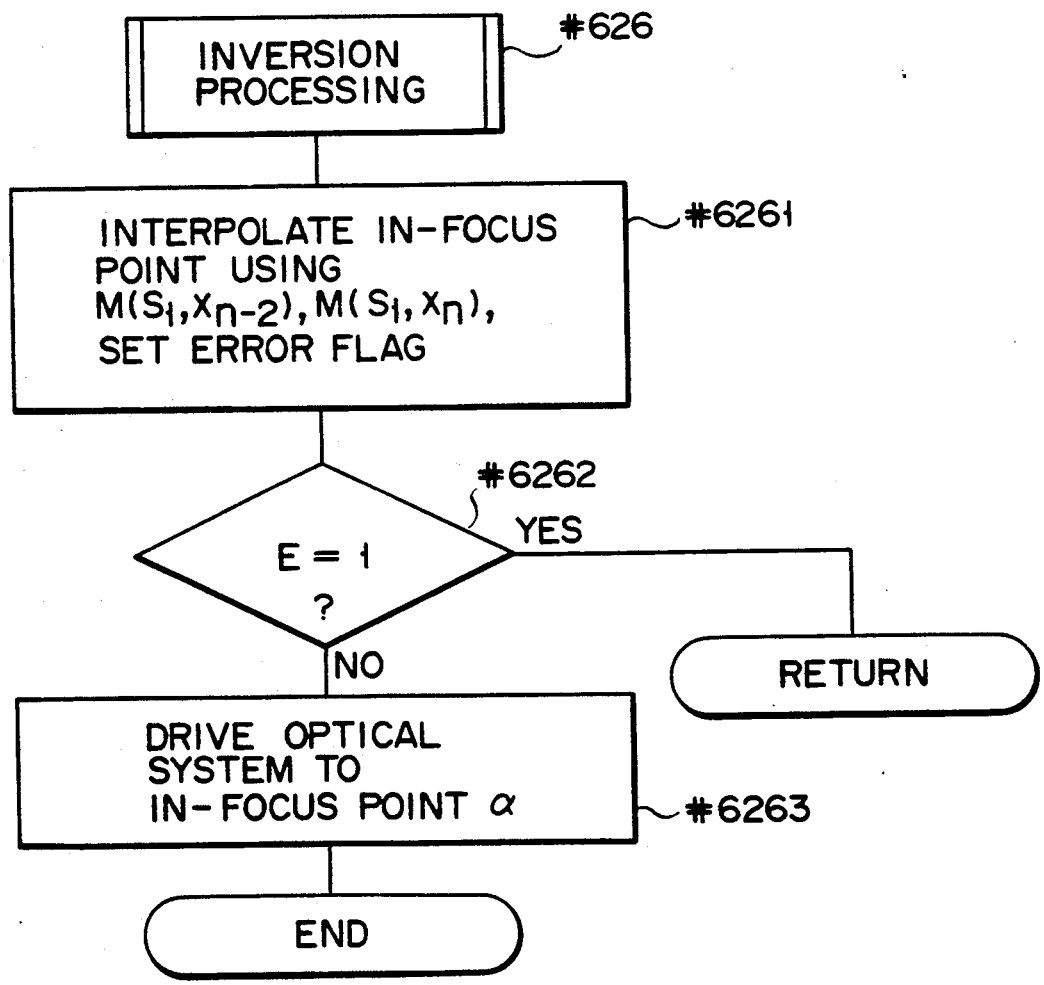
FIG. 21 is a flow chart showing an inversion processing subroutine in FIG. 19.

The inversion subroutine in step #626 in FIG. 19 will be described below. A case wherein the total inversion count rv is less than one will be described below with reference to FIG. 20. In such a case, when two points $P_0$ and $P_1$ are detected by using a band $S_1$ as a detection frequency band, the band $S_1$ is switched to a band $S_2$ to detect two points $Q_1$ and $Q_2$, and the moving direction is inverted. In this case, although one of the detected points exceeds the in-focus point, three point interpolation cannot be performed due to irregular sampling intervals. In order to perform three point interpolation, the driving direction of the photographing optical system 1 must be inverted to detect new focus signals at three points, resulting in an increase in time loss. For this reason, the in-focus point is obtained at high speed by interpolation of the above-mentioned two points located on both sides of the in-focus point. In this case, however, the low band $S_1$ is used to satisfy $|x_2 - x_0| \leq 2d'_{FZP}$. Though the points $x_0$ and $x_2$ always located on both sides of the in-focus point, the points $x_1$ and $x_2$ does not always located on both sides of the in-focus point. The band $S_2$ is not selected since the condition shown in FIG. 10 is not always satisfied. The microprocessor 22 executes the inversion processing in accordance with the flow chart shown in FIG. 21. In step #6261, a division value l' obtained by dividing the interval l between the two points $x_0$ and $x_1$ located on both sides of the in-focus point by the intermediate parameter $d'_{FZP}$ and a ratio R ($= P_0/P_2$) of the focus signal value are input to the table in the ROM 23, and a value D' associated with the in-focus point is read from the table, the value D' is multiplied by the intermediate parameter $d'_{FZP}$ and $x_2$ is added to the multiplication result, thereby obtaining the in-focus point $\alpha$, as is shown in FIG. 14. At this time, the error flag is set at "1" or "0".

In step #6262, the value of the error flag E is checked. If it is "1", it indicates that the table cannot be referred. As a result, the flow returns to the original routine, i.e., step #627 in the focus detection subroutine in FIG. 19 to invert the driving direction of the photographing optical system 1, thus continuing the focus detection processing. If the error flag is set at "0", the photographing optical system 1 is moved to the in-focus point $\alpha$ in step #6263, and the focus detection processing is completed. By performing such inversion processing, two point interpolation can be performed to increase the focusing speed.

The end point processing subroutine in step #60 in the auto-focusing subroutine will be described below with reference to FIG. 22. The end processing is performed in a case wherein the photographing optical system 1 reaches an end point (infinite position or closest position) if focus signals are to be sampled with the current interval $\Delta x_L$, i.e., in a case wherein three point interpolation cannot be performed.

In step #601, in order to decrease the interval $\Delta x_L$, it is checked whether the detection band $S_d$ can be switched to a band of higher frequencies. If YES in step #601, a new frequency $S_d$ is set in step #603. In step #604, an intermediate parameter $d_{FZP}$ and an interval $\Delta x$ are calculated. In step #605, a new interval $\Delta x_L$ is obtained. In step #606, it is checked whether the photographing optical system 1 reaches the end point. If YES in step #606, a two point interpolation subroutine is performed in step #602. If it is determined in step #601 that the band switching operation cannot be performed, two point interpolation is also executed in step #602. If NO in step #606, the flow returns to the original routine, i.e., step #61 in the auto-focusing subroutine in FIG. 18.

Figure 23:
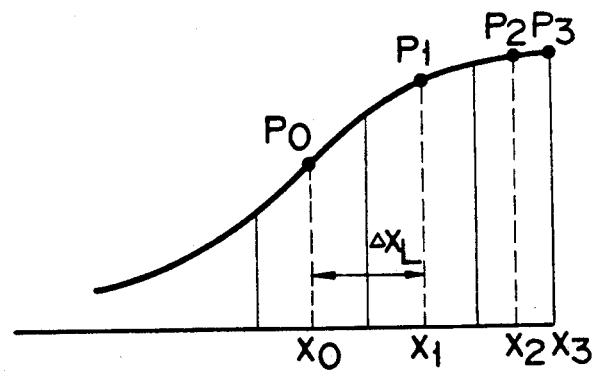
FIG. 23 is a graph showing two points used in two point interpolation.

Two interpolation at an end point will be described with reference to FIG. 23. It is assumed that focus signals are sampled at two points $P_0$ and $P_1$, and it is detected that the photographing optical system 1 reaches an end point in the next detection or a band switching operation cannot be performed. In this case, the photographing optical system 1 is driven to the end point $P_3$, and detection of point $P_2$ and $P_3$ is performed. On the basis of the relationship in level between these three points $P_1$ to $P_3$, two point interpolation is performed in the following manner.

If $P_1 < P_2 < P_3$, since $x_2 < \alpha < x_3$, two point interpolation is performed by using the point $P_2$ and $P_3$.

If $P_1 > P_2$, since $x_0 < \alpha < x_2$, two point interpolation is performed by using the points $P_0$ and $P_2$.

In addition, if $P_1 < P_2$, and $P_2 > P_3$, since $x_1 < \alpha < x_3$, two point interpolation is performed by using the points $P_1$ and $P_3$.

FIG. 24 shows a flow chart of a two point interpolation subroutine. In step #6021, it is checked whether a current position $x_n$ is an end point. If YES in step #6021, a focus signal value at the position $x_n$ is input in step #6022, and a focus signal value at a position $x_{n-2}$ two fields ahead of the position $x_n$ is input in step #6023, thus performing the interpolation routine by using these two points.

Figure 25:
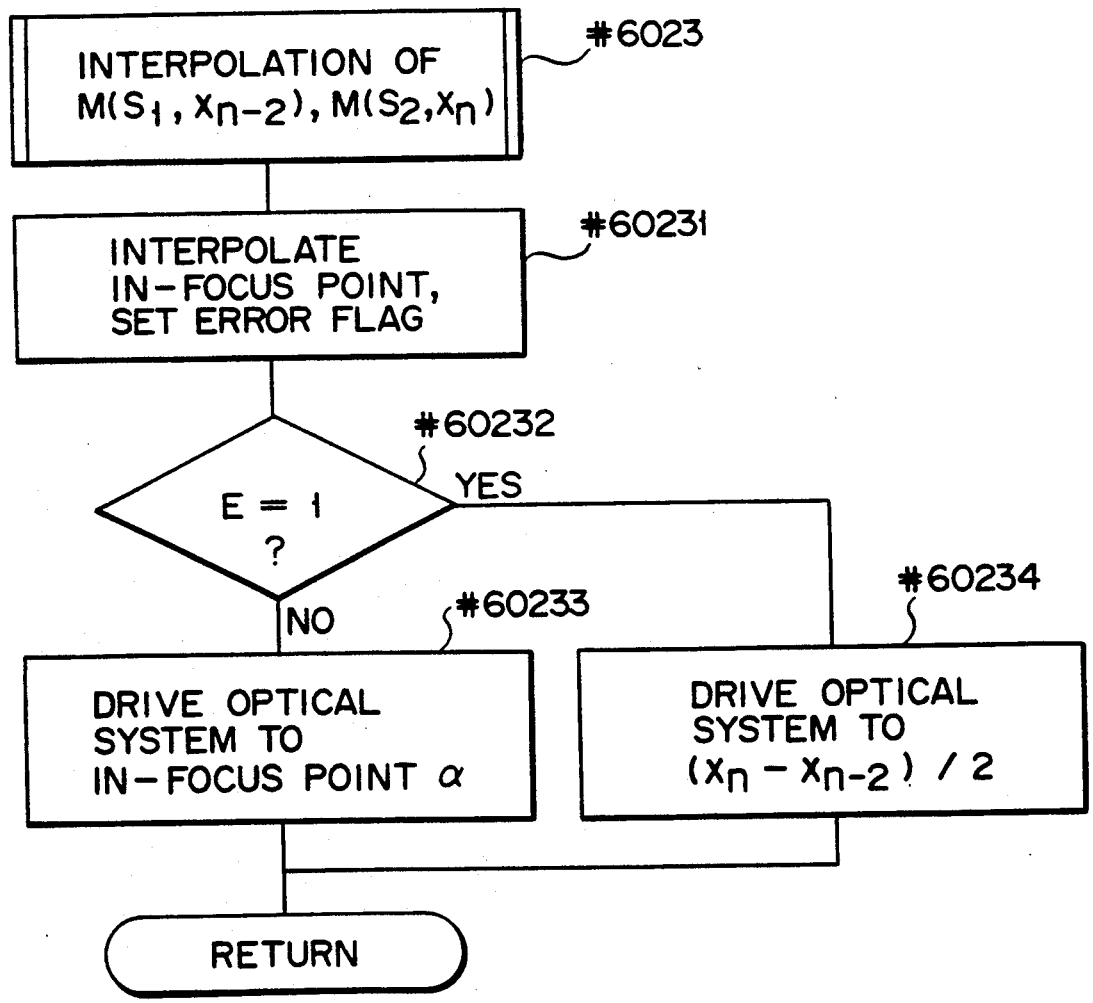
FIG. 25 is a flow chart showing an interpolation subroutine in FIG. 24.

FIG. 25 shows this interpolation subroutine in detail. In step #60231, an in-focus point $\alpha$ is obtained by referring to the table, and the error flag E is set at "0" or "1". In step #60232, the value of the error flag E is checked. If it is "1", the optical system 1 is moved to the middle point between the two points $x_n$ and $x_{n-1}$ in step #60234. If it is "0", the optical system 1 is moved to the in-focus point $\alpha$ in step #60233. Subsequently, the flow returns to the original routine.

If NO in step #6021, another focus signal is input in step #6024, and an increase/decrease in focus signal value is checked in step #6025. If a decrease in focus signal is detected, two point interpolation is performed by using $M(S_1, x_{n-2})$ and $M(S_1, x_n)$ in step #6023. If an increase in focus signal value is detected, another focus signal is input in step #6026. At this time, the increase/decrease in focus signal is checked again. If an increase in focus signal value is detected, interpolation is performed by using the two points $M(S_1, x_{n-1})$ and $M(S_1, x_n)$ in step #6028. This interpolation is the same as that in the flow chart shown in FIG. 25 except that $x_{n-2}$ is changed into $x_{n-1}$ and hence illustration thereof will be omitted. If a decrease in focus signal value is detected, two point interpolation is performed by using the two points $M(S_1, x_{n-2})$ and $M(S_1, x_n)$ in step #6023. It is to be noted that this two point interpolation can be stably performed by using a signal having the minimum frequency $S_1$ as a focus signal.

As described above, according to this embodiment, the intermediate parameter $d_{FZP}$ which characterizes a focus signal curve is detected from the F-number of the photographing optical system 1 and the frequency band (BPF) S according to equation (8), and the optimal sampling interval $\Delta x$ is obtained from the intermediate parameter $d_{FZP}$ and the constant $C_{OPT}$ based on a detection scheme according to equation (9). Therefore, the optimal sampling interval $\Delta x$ which is free from the influences of noise and minimizes an error due to interpolation can be obtained. In addition, since an in-focus point is detected on the basis of focus signal values obtained upon a driving operation at the optimal sampling interval $\Delta x$ and the optimal sampling interval $\Delta x$, highly accurate focus adjustment can be performed within a short period of time. Furthermore, since focus adjustment can be performed with simple arithmetic processing, the focusing speed can be further increased.

In the algorithm of focus detection, interpolation processing based on sample data at three points having the optimal sampling interval is basically utilized. If sampling data at three points cannot be obtained, as in cases wherein the driving direction of the photographing optical system 1 is inverted and the photographing optical system 1 is located at an end point, two point interpolation is utilized, thus enabling high-precision, high-speed focus adjustment.

In addition, according to this embodiment, the different band-pass frequencies $S_1$ to $S_4$ are respectively set for the BPFs $6a$ to $6d$, and the frequency S which satisfies $S_{min} \leq S \leq S_B$ and at which the maximum focus signal value appears is selected by using various types of parameters, e.g., the focal length f of the photographing optical system 1, the closest distance $a_{min}$, the driving velocity of the optical system 1, and focus signal values as an object pattern. With this operation, an optimal band can be set, and the focusing precision can be further improved.

Furthermore, in two point interpolation using the table, since data are normalized by using the intermediate parameter $d_{FZP}$, only one table is required to store such data regardless of the F-number and the frequency band, thus reducing the size of a circuit.

In the embodiment described above, A/D conversion is performed after detection. However, A/D conversion may be performed immediately after data is output from the pre-amplifier, and the digital band-pass filters may be subsequently used. In addition, although the one-dimensional filters used as the BPF in the above description, it is apparent that two-dimensional filters may be used. If the proportional coefficient C(f) in equation (18) varies depending on the photographing optical system 1, different proportional coefficients may be stored in a ROM in the optical system 1. Furthermore, the square detection circuit is used as the focus signal detection. However, other circuits, e.g., absolute value circuits may be used. In this case, however, $C_{OPT}$ must be optimized in accordance with a detection scheme. In the above description, it is assumed that only a adjusting lens in the optical system 1 is moved to focus. However, if the whole photographing optical system 1 is moved or the CCD 2 is moved to focus, $C(f) = 1$ is set.

Moreover, in the embodiment described above, an optimal sampling interval is obtained by switching the BPFs 5. However, an optimal sampling interval may be obtained by changing the F-number of the photographing optical system 1 with the frequency band S being kept constant. With this arrangement, since only a single BPF and a single detector of a focus signal are required, a reduction in size of a circuit can be realized. In addition, the band S of the BPF and the F-number may be changed to always set a constant optimal sampling interval. Furthermore, although a band below the standard frequency $S_B$ is selected for each BPF, the band may be expanded to include a frequency equal to the standard frequency $S_B$.

The second embodiment of the present invention will be described below. In general, when an object to be photographed (to be referred to as a moving object hereinafter) which is moving in the direction of an optical axis is to be focused, the moving object moves during an interval between the instant at which an in-focus point is detected and the instant at which a photographing optical system is moved to the in-focus point, resulting in a shift of the in-focus point. In order to eliminate such inconvenience, a change in in-focus point must be predicted in consideration of the moving direction and rate (to be referred to as velocity in consideration of the direction) of the moving object at the time of detection, and the time required for driving the photographing optical system, and the optical system must be moved to the predicted in-focus position. An auto-focusing scheme in consideration of the velocity of a moving object is generally called a moving prediction AF. In this moving prediction AF, since an in-focus point cannot be obtained by one detection, it is considered that this scheme is not suitable for a focusing apparatus based on interpolation. In order to solve such a problem, the second embodiment of the present invention has a moving object prediction function in addition to the function of the first embodiment.

FIG. 26 shows an arrangement of an auto-focusing apparatus according to the second embodiment of the present invention. The same reference numerals in FIG. 26 denote the same parts as in FIG. 15. In the apparatus shown in FIG. 15, outputs from the pre-amplifier 4 are subjected to parallel processing in the plurality of BPFs. In the second embodiment, processing is performed in only a single system. However, it is apparent that parallel processing can also be performed in this embodiment. In addition to the arrangement of the first embodiment, the second embodiment includes a lens position signal memory 31, a focus signal memory 32, an interpolation circuit 33, a velocity detection circuit 34, an intermediate parameter calculation circuit 35, and a microprocessor 36.

Positions x of a photographing optical system 1 on the optical axis are sequentially stored in the lens position signal memory 31. A focus signal P output from a digital integrator 11 is input to the focus signal memory 32, and its signal value is stored. The interpolation circuit 33 executes interpolation on the basis of position data xd ($x_0$, $x_1$, $x_2$) at three points of the photographing optical system 1 which are read out from the lens position signal memory 31, and three focus signal values Pd ($P_0$, $P_1$, $P_2$) read out from the focus signal memory 32 in correspondence with the three points. The interpolation circuit 33 outputs a calculated in-focus point $\alpha$ to the velocity detection circuit 34 and the microprocessor 36. The velocity detection circuit 34 calculates a moving velocity V of the object to be photographed on the basis of the position data xd of the photographing optical system 1, the focus signal values Pd, the in-focus point data $\alpha$, and an intermediate parameter $d_{FZP}$ calculated by the intermediate parameter calculation circuit 35. The velocity detection circuit 34 outputs the calculation result to the microprocessor 36. The microprocessor 36 calculates the moving direction and moving distance of the photographing optical system 1 in consideration of the moving velocity of the optical system 1 on the basis of the moving velocity V of the optical system 1, focal length information f of the optical system 1, and the in-focus point $\alpha$. The microprocessor 36 then outputs a driving control signal to a motor driving circuit 15.

Figure 28:
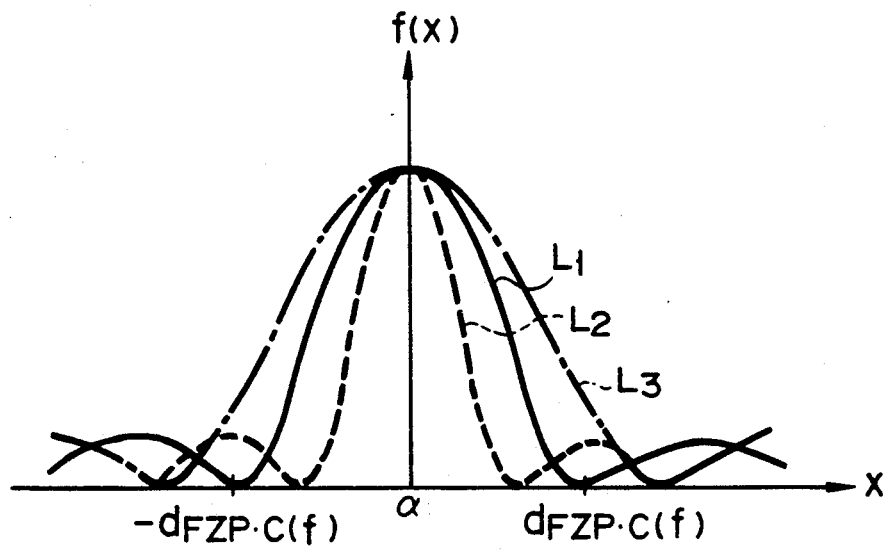
FIG. 28 is a graph, showing changes in the focus signal curve due to the movement of an object to be focused, for explaining a principle of velocity detection with respect to a moving object.
Figure 29A:
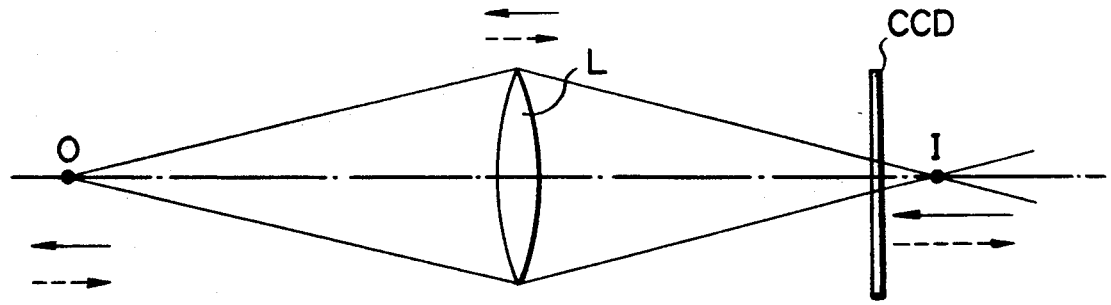
FIG. 29A is a view showing a movement of an imaging plane in a case wherein the object and an optical system are moved in the same direction.
Figure 29B:
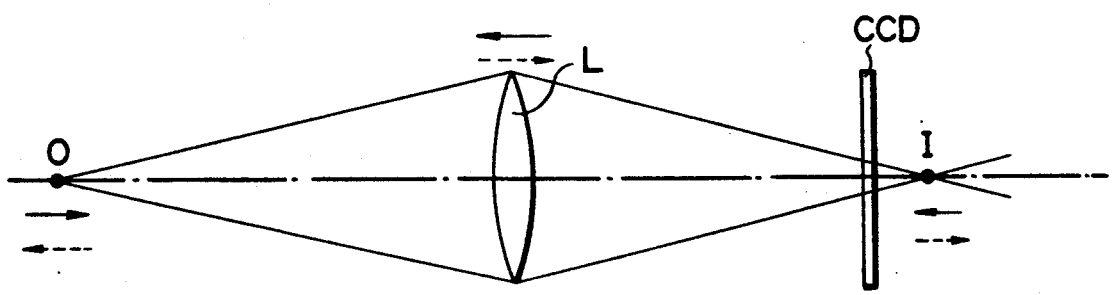
FIG. 29B is a view showing the movement of the imaging plane in a case wherein the object and the optical system are moved in opposite directions.

A principle of velocity detection in the velocity detection circuit 34 will be described in detail below with reference to FIGS. 27 to 32. FIG. 28 shows changes in the waveform of a focus signal curve f(x) in accordance with the movement of an object to be photographed. A solid curve $L_1$ indicates a case wherein the object is not moved. In this case, when the photographing optical system 1 is moved from the in-focus point $\alpha$ by $d_{FZP} \cdot C(f)$ (or $-d_{FZP} \cdot C(f)$), a focus signal value becomes zero. A broken curve L2 and an alternate long and short dashed curve L3 indicate cases wherein the object is moving. The curve L2 is obtained when the moving direction of the object coincides with the moving direction of the photographing optical system 1 (such movement will be referred to as the same direction movement hereinafter). This state corresponds to the state shown in FIG. 29A. The curve L3 is obtained when the moving direction is different from that of the photographing optical system 1 (such movement will be referred to as an opposite direction movement hereinafter). This state corresponds to the state shown in FIG. 29B.

In the same direction movement, the width of the focus signal curve L2 is smaller than that of the curve L1. In contrast to this, in the opposite direction movement, the width of the focus signal curve L3 becomes larger than that of the curve L1. Therefore, by detecting an increase/decrease in the width of the focus signal curve, the moving direction of the object can be detected from the direction of the increase/decrease, and the velocity of the object can be detected from the increase/decrease amount. In this embodiment, the magnitude of the increase/decrease in the width of a focus signal curve is detected by using an intermediate parameter $d_{FZP}$.

Figure 30:
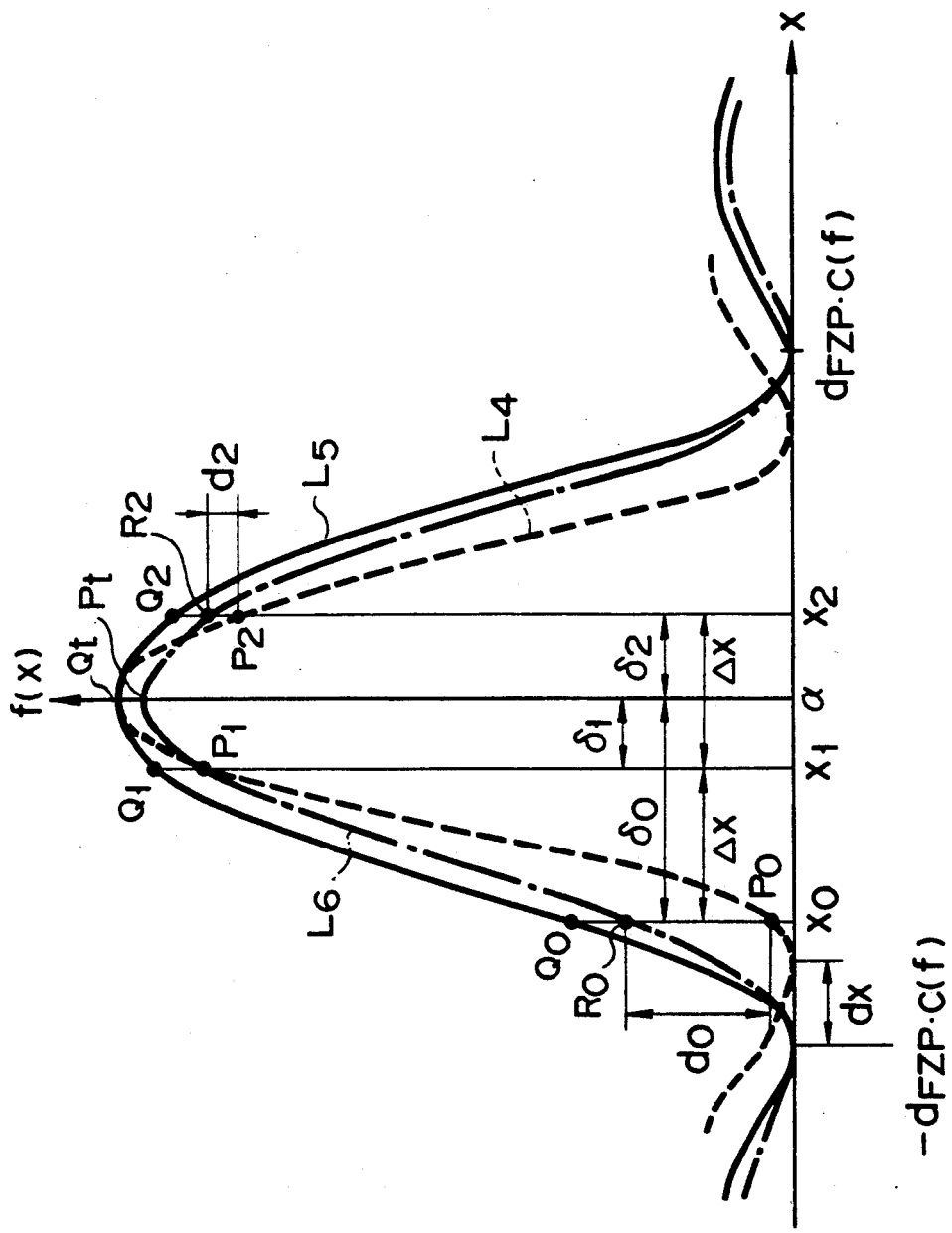
FIG. 30 is a graph showing a principle of velocity detecting according to the second embodiment.

It is assumed that the object O is sufficiently away from the photographing optical system L and moves along the direction of the optical axis at a constant velocity, while its imaging point I moves along the direction of the optical axis at a constant velocity. In this case, the waveform of the focus signal curve is symmetrical about the in-focus point. When a focusing operation is to be performed in the same manner as in the first embodiment, an optimal sampling interval $\Delta x$ for driving the photographing optical system 1 is calculated, and focus signals are detected at the calculated sampling interval. It is assumed that focus signal curves shown in FIG. 30 are obtained upon this detection. is to be noted that reference symbols $P_0$, $P_1$, $P_2$ denote focus signal values actually detected ($P_0 \leq P_1$, $P_2 \leq P_1$), and a broken curve L4 indicates a real focus signal curve. The in-focus point $\alpha$ is obtained by three point interpolation using these values $P_0$, $P_1$, $P_2$. A solid curve L5 in FIG. 30 indicates a focus signal curve obtained when the object stands still at the in-focus point $\alpha$. The focus signal curves L4 and L5 have the same maximum value Qt. The difference between the focus signal curves L4 and L5 is based on the movement of the object. For example, therefore, by obtaining a distance dx (the interval between points at which the focus signal values of the two curves become zero for the first time), the moving direction and velocity of the object can be detected. In practice, however, the curves L4 and L5 cannot be obtained from the three points $P_0$, $P_1$, $P_2$.

For this reason, a focus signal curve L6 which passes through the point $P_1$ and is based on a focus signal obtained when the object is not moved is assumed by using the intermediate parameter $d_{FZP}$. Reference symbol Pt denotes the maximum value of the focus signal curve L6. The curve L6 becomes zero at $d_{FZP} \cdot C(f)$ and $-d_{FZP} \cdot C(f)$. Differences $d_0$ and $d_2$ between focus signal values $R_0$ and $R_1$ and the points $P_0$ and $P_2$ at lens positions $x_0$ and $x_2$ on the curve L6 are respectively obtained in the following manner:

$$d_0 = P_0 - R_0$$

$$d_2 = P_2 - R_2$$

These differences are then normalized with Pt and are defined as follows:

$$d_0' = d_0/Pt$$

$$d_1' = d_1/Pt$$

These normalized differences $d_0'$ and $d_1'$ are used. The differences $d_0'$ and $d_2'$ are determined solely by a distance $\delta_1$ between the lens position $x_1$, at which the maximum focus signal value appears, and the in-focus point $\alpha$, and the moving velocity of the object, since $d_0$ and $d_2$ varies as is shown in FIG. 30 if the curve L4 is shifted toward or away from the curve L5. Since these data are normalized with Pt, the data are not dependent on the amplitude of a focus signal, i.e., an object pattern. In this manner, the moving direction and velocity of the object can be detected from the differences $d_0'$ and $d_2'$ of the focus signals, and the distance $\delta_1$.

FIG. 27 is a block diagram showing the velocity detection circuit 34 for executing the above-described velocity detecting operations.

In the velocity detection circuit 34, of focus signal values Pd ($P_0$, $P_1$, $P_2$) read out from the focus signal memory 32, the intermediate value $P_1$ is supplied to a Pt detector 41. As a result, the maximum value Pt of a focus signal curve is detected based on an equation $Pt = P_1/R_0'$. Meanwhile, the values $P_0$ and $P_2$ are respectively input to dividers 42 and 43. The maximum value Pt is input to each of the dividers 42 and 43, and quotients $P_0'$ and $P_2'$ are respectively input to subtracters 44 and 45.

Figure 31:
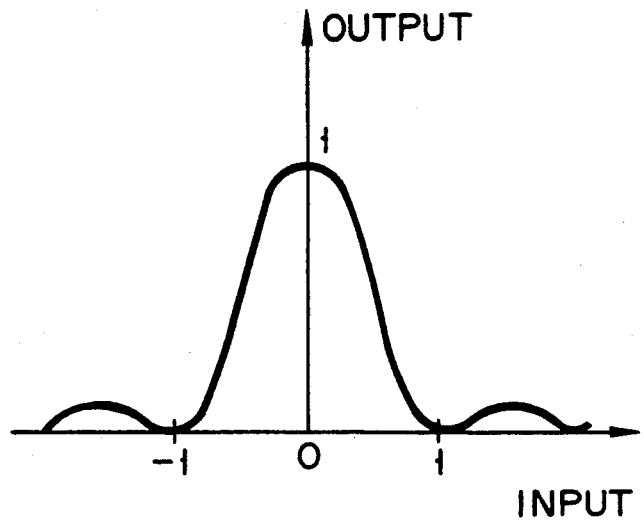
FIG. 31 is a graph showing the contents of a standard curve ROM in FIG. 27.

The position data xd ($x_0$, $x_1$, $x_2$), of the photographing optical system 1, read out from the lens position signal memory 31 are respectively input to the subtracters 46, 47 and 48. The in-focus point $\alpha$ which is obtained by the same interpolation processing as in the first embodiment by means of the interpolation circuit 33 is supplied to each of the subtracters 46, 47 and 48. The substraction results obtained by subtracting the in-focus point $\alpha$ from the positions $x_0$, $x_1$, and $x_2$ of the photographing optical system 1 on the optical axis, i.e., defocus amounts $\delta_0$, $\delta_1$ and $\delta_2$ are respectively output to the dividers 49, 50 and 51. In addition, the data of the focal length f of the photographing optical system 1 is input to a coefficient ROM 52. The input data f is then converted into proportional coefficient data C(f) representing the relationship between the movement of the imaging plane and that of the optical system and included in equation (18). The data C(f) is input to a multiplier 53. The intermediate parameter $d_{FZP}$ calculated by the intermediate parameter calculation circuit 35 is input to the multiplier 53. An output from the multiplier 53 is input to the dividers 49, 50 and 51. Defocus amounts $\delta_0'$, $\delta_1'$, $\delta_2'$ normalized with the intermediate parameter $d'_{FZP}$ from the dividers 49, 50 and 51 are respectively input to standard curve ROMs 54, 55 and 56. These standard curve ROMs 54, 55 and 56 have an input/output relationship in the form of Bessel function as is shown in FIG. 31. The values stored in the standard curve ROMs 54, 55 and 56 are normalized with the intermediate parameter. Outputs $R_0'$ and $R_2'$ from the standard curve ROMs 54 and 56 are respectively input to the subtracters 44 and 45, whereas an output $R_1'$ from the standard curve ROM 55 is input to the Pt detector 41. The differences $d_0'$ and $d_2'$ from the subtracters 44 and 45 are input to a velocity detection ROM 57. In the velocity detection ROM 57, a current velocity V of the object is obtained from the differences $d_0'$ and $d_2'$ and the normalized defocus amount $\delta_1'$ to the maximum point of the three points of the focus signal curve.

An operation of the second embodiment having the above-described arrangement will be described below.

In the second embodiment, it is assumed that when a focusing operation is completed, the photographing optical system 1 is located a position nearest to the CCD 2. At this position, the optical system 1 normally focuses an object to an infinity position. In this embodiment, however, the optical system 1 is located closer to the CCD 2 than the above-mentioned position. More specifically, when a focusing operation is started, the second principle plane of the photographing optical system 1 is located at a position A in FIG. 32. In this case, the second principle plane is a plane perpendicular to the optical axis of the photographing optical system 1 wherein the distance to a point where parallel incident light crosses the optical axis coincides with a focal length f of the optical system 1. It is to be noted that a position B indicates the position of the second principle plane on which an object focused to the infinity position (object distance $a = \infty$) is to be photographed. An imaging distance (focal length f) at this time coincides with the distance between the second principle plane and the CCD 2.

When a focusing operation is started, a driving operation of the photographing optical system 1 is started to move the second principle plane from the position A to the position B. At the same time, a focus signal P is detected every time the optimal sampling interval $\Delta x$ is calculated, in the same manner as in the first embodiment. The position x of the photographing optical system 1 at this time is stored in the lens position signal memory 31. The focus signals are stored in the focus signal memory 32.

On the basis of the three consecutive focus signal values $P_0$, $P_1$, $P_2$, the interpolation circuit 33 determines whether interpolation can be performed. The interpolation can be performed if $P_0 < P_1$, and $P_2 < P_1$. On the other hand, the interpolation cannot be performed if $P_0 < P_1 < P_2$. If it is detected that the interpolation can be performed, interpolation is executed to calculate the in-focus point $\alpha$. At the same time, the velocity detection circuit 34 executes detection processing of the velocity V. The microprocessor 36 calculates the time required for a focusing operation and the moving distance of the object by a known method on the basis of the in-focus point $\alpha$ and the velocity V. The microprocessor 36 then outputs a driving control signal to the motor driving circuit 15. With this operation, the photographing optical system 1 is moved to the in-focus point by the pulse motor 16 whose rotation amount and direction are controlled by the motor driving circuit 15.

If focus adjustment is completed in this manner, the photographing optical system 1 is driven in accordance with the movement of the object. When a release button is depressed by a user, an image signal is written in a recording medium (not shown). At the same time, the photographing optical system 1 returns to the position A, thus completing the focusing operation.

As described above, according to this embodiment, the moving velocity V of a moving object is detected by the velocity detection circuit 34, and the movement of the in-focus point is predicted from the velocity V and the in-focus point $\alpha$, thereby moving the photographing optical system 1 in accordance with the movement of the object. With this operation, highly accurate focus adjustment can be performed with respect to a moving object.

In addition, since the photographing optical system 1 is moved from a position closer to the CCD 2 than a position corresponding to an infinity focusing position, focus signals at three points can always be obtained. Hence, a complicated algorithm such as algorithm for end point processing for two point interpolation described in the first embodiment is not required.

In the second embodiment, an output from the pre-amplifier 4 is processed by the single system. However, parallel processing of a plurality of outputs may be performed by using different frequencies in the same manner as in the first embodiment. In addition, if a moving object moves vertically or horizontally on the CCD 2 in addition to the movement along the optical axis, only a desired object signal may be through a gate 8 by a focusing area designating device 21 on the basis of the moving amount of the object.

As has been described in detail above, according to the present invention, there is provided an auto-focusing apparatus which can obtain an optimal sampling interval and can detect an in-focus point at high speed with very high precision by means of interpolation. In addition, there is provided an auto-focusing apparatus which can move a photographing optical system to an in-focus point predicted from the moving velocity of an object even if the object is moving, and can perform high-precision focus adjustment with respect to a moving object.

Figure 32:
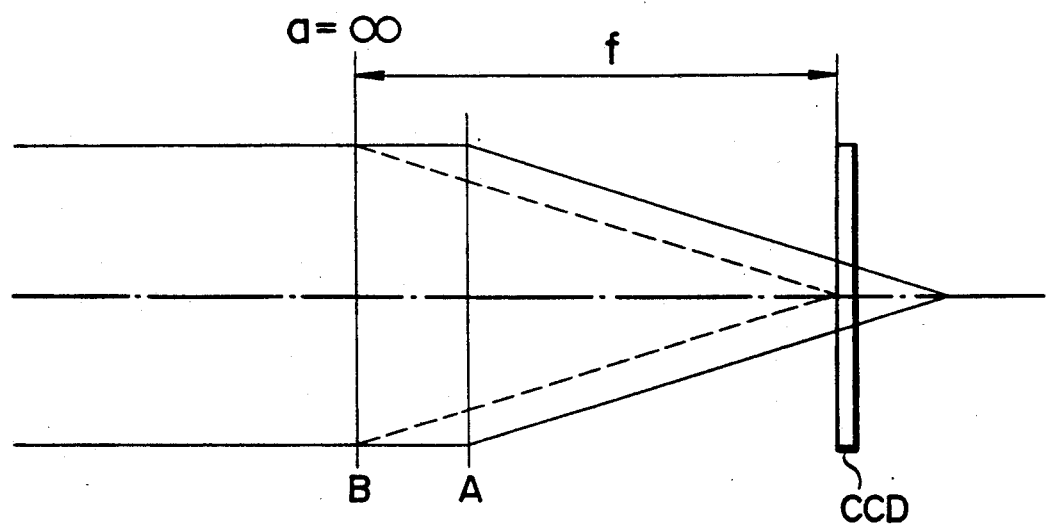
FIG. 32 is a view showing an arrangement of an optical system according to the second embodiment.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, interpolation is not limited to a linear interpolation using three points, but nonlinear interpolation of a higher order may be performed. Furthermore, similar to the second embodiment, in the first embodiment, the initial position of the optical system may be returned to a position within the distance f from the imaging plane, as shown in FIG. 32, so that two point interpolation need not be performed. Alternatively, only two point interpolation may be performed to realize high-speed focusing operation. Moreover, the present invention is not limited to an electronic still camera, but may be applied to a video camera, a conventional camera using a silver-salt film, a motion-picture camera, a microscope, a telescope, an endoscope, and the like.

What is claimed is:

1. An auto-focusing apparatus comprising:
   an optical system for obtaining an optical image of an object;
   means for imaging the optical image;
   driving means for moving at least one of said imaging means and said optical system along a direction of an optical axis;
   filter means for extracting a predetermined frequency component from an output signal from said imaging means;
   detecting means for detecting an output signal from said filter means and generating a focus signal representing a focusing degree of the optical image, which is a function of relative positions of said imaging means and said optical system;
   means for obtaining an intermediate parameter which characterizes a function curve of the focus signal on the basis of the frequency component extracted by said filter means and an F-number of said optical system;
   means for determining a sampling interval on the basis of a constant representing a characteristic of said detecting means and the intermediate parameter; and
   means for obtaining an in-focus point by sampling the focus signal every sampling interval while at least one of said optical system and said imaging means is moved by said driving means and interpolating a plurality of sampled signal values.

2. An apparatus according to claim 1, wherein
   said means for obtaining the intermediate parameter comprises means for obtaining the intermediate parameter by dividing the F-number by the frequency of said filter means, and
   said sampling interval determining means comprises means for determining the sampling interval by multiplying the constant by the intermediate parameter.

3. An apparatus according to claim 1, wherein said means for obtaining the in-focus point comprises means for detecting the in-focus point on the basis of a ratio of focus signal values at two points located on both sides of the in-focus point, and a distance between the two points which is normalized with the intermediate parameter.

4. An apparatus according to claim 1, wherein said optical system has a second principle plane, and an initial position of said optical system is a position where a distance between the second principle plane and said imaging means becomes smaller than an imaging distance of the object positioned at infinity.

5. An apparatus according to claim 1, wherein said filter means comprises a plurality of filters for extracting a plurality of different frequency components of output signals from said imaging means, and means for selecting an optimal frequency component in accordance with an image range of said optical system, a lowest frequency obtained from said driving means, F-number, and focus signals obtained from the frequency components extracted by said plurality of filters, and said means for obtaining the in-focus point comprises means for obtaining an in-focus point on the basis of sample values of a focus signal obtained from the frequency components selected by said selecting means.

6. An apparatus according to claim 1, further comprising:

means for detecting a velocity of the object in the direction of the optical axis on the basis of the intermediate parameter, the focus signal, and position information of said optical system; and means for correcting the focus signal on the basis of the velocity.

7. A focus detecting apparatus comprising:

means for imaging an optical image of an object, and outputting an image signal;

means for adjusting a focus of said imaging means;

detecting means for detecting a predetermined frequency component of the image signal and generating a focus signal representing a focusing degree of said imaging means;

means for obtaining a parameter for characterizing the focus signal on the basis of the predetermined frequency of said detecting means and a characteristic value of said imaging means; and means for performing focus adjustment by using said adjusting means, sampling focus signal values at a sampling interval corresponding to the parameter, and interpolating sample values, thereby obtaining an in-focus point.

8. An apparatus according to claim 7, wherein said means for obtaining the parameter comprises means for obtaining a parameter which is proportional to an F-number of an optical system of said imaging means and inversely proportional to the predetermined frequency, and said means for performing focus adjustment comprises means for controlling said adjusting means and adjusting a focus of said imaging means at a constant speed, and means for sampling an output from said detecting means in a cycle corresponding to a product of the parameter and a constant corresponding to a detection scheme of said detecting means during the focus adjustment.

9. An apparatus according to claim 8, wherein said means for performing focus adjustment calculates an in-focus point $a$ by using a maximum value $P_1 (= f(x_m))$ of sample values of a focus signal $f(x)$, and sample values $P_0 (= f(x_{m-1}))$ and $P_2 (= f(x_{m+1}))$ at two points on both sides of the maximum value Pl according to the following equations:

if $P_0 \geq P_2$, $a = x_m - (\Delta x/2)(P_0 - P_2)/(P_1 - P_2)$ if $P_0 < P_2$, $a = x_m + (\Delta x/2)(P_2 - P_0)/(P_1 - P_0)$ where m is a positive integer and $\Delta x$ is a distance the focus of said imaging means move in the cycle.

10. An apparatus according to claim 9, wherein said imaging means comprises an optical system for forming an optical image of the object, and means for setting an initial position of said optical system at a position where a distance between a second principle plane and an imaging plane becomes smaller than an imaging distance of the object positioned at infinity.

11. An apparatus according to claim 8, wherein said means for performing focus adjustment obtains an in-focus point on the basis of a ratio of modulation transfer function values at two sampling points located on both sides of the in-focus point, and a distance between the two points.

12. An apparatus according to claim 11, wherein said means for obtaining the in-focus point includes a table for storing the ratio and corresponding data obtained by normalizing a relationship between the distance and the in-focus point with the parameter, and obtains the in-focus point by referring to said table based on the ratio.

13. An apparatus according to claim 7, wherein said detecting means comprises means for detecting a predetermined frequency component of only signals, of one frame of image signal, in a predetermined focusing area, and the predetermined frequency component is set to a frequency which falls within a frequency range determined by a size of a focusing area and is not more than a frequency determined by a focus adjustment speed, and at which a maximum focus signal value appears.

14. An apparatus according to claim 7, further comprising:

means for detecting a shift of a position of a first zero point of a focus signal curve in accordance with the parameter, and detecting a moving velocity of the object on the basis of the detected shift; and means for correcting the in-focus point on the basis of the velocity.

15. An apparatus according to claim 14, wherein said moving velocity detecting means forms a focus signal curve associated with a still object on the basis of the parameter, and obtains a moving velocity on the basis of differences $d_0 = P_0 - R_0$ and $d_2 = P_2 - R_2$ between focus signal values $R_0$ and $R_2$ at two points $x_0$ and $x_2$ located on both sides of the in-focus point on the curve and focus signal values $P_0$ and $P_2$ at the two points $x_0$ and $x_2$ which are obtained when the object is actually imaged.

16. An apparatus according to claim 15, wherein said moving velocity detecting means includes a table for storing data obtained by normalizing a relationship between the differences and the moving velocity with a maximum value of the focus signal curve associated with the still object, and obtains a moving velocity by referring to said table.

* * * * *